(12) United States Patent
Jung et al.

(10) Patent No.: US 8,065,404 B2
(45) Date of Patent: Nov. 22, 2011

(54) LAYERING DESTINATION-DEPENDENT CONTENT HANDLING GUIDANCE

(75) Inventors: Edward K. Y. Jung, Bellevue, WA (US); Royce A. Levien, Lexington, MA (US); Robert W. Lord, Seattle, WA (US); Mark A. Malamud, Seattle, WA (US); William Henry Mangione-Smith, Kirkland, WA (US); John D. Rinaldo, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 1026 days.

(21) Appl. No.: 11/897,988

(22) Filed: Aug. 31, 2007

(65) Prior Publication Data

US 2009/0313332 A1 Dec. 17, 2009

(51) Int. Cl.
*G06F 15/173* (2006.01)
(52) U.S. Cl. ...................................... 709/223
(58) Field of Classification Search ................ 709/223, 709/206
See application file for complete search history.

(56) References Cited

U.S. PATENT DOCUMENTS

| | | |
|---|---|---|
| 5,128,938 A | 7/1992 | Borras |
| 5,548,535 A | 8/1996 | Zvonar |
| 5,596,750 A | 1/1997 | Li et al. |
| 5,812,865 A | 9/1998 | Theimer et al. |
| 5,892,909 A | 4/1999 | Grasso et al. |
| 6,006,225 A | 12/1999 | Bowman et al. |
| 6,009,433 A | 12/1999 | Kurano et al. |
| 6,014,716 A | 1/2000 | Ohara |
| 6,031,453 A | 2/2000 | Brinzer |
| 6,074,787 A | 6/2000 | Takeuchi |
| 6,081,816 A | 6/2000 | Agrawal |
| 6,105,072 A | 8/2000 | Fischer |
| 6,151,311 A | 11/2000 | Wheatley, III et al. |
| 6,157,379 A | 12/2000 | Singh |
| 6,192,396 B1 | 2/2001 | Kohler |
| 6,208,965 B1 | 3/2001 | Brown et al. |
| 6,212,553 B1 | 4/2001 | Lee et al. |
| 6,219,731 B1 | 4/2001 | Gutowitz |
| 6,237,141 B1 | 5/2001 | Holzle et al. |
| 6,243,378 B1 | 6/2001 | Olnowich |
| 6,263,311 B1 | 7/2001 | Dildy |
| 6,266,675 B1 | 7/2001 | Evans et al. |
| 6,287,125 B1 | 9/2001 | Dorcely |
| 6,308,148 B1 | 10/2001 | Bruins et al. |
| 6,320,112 B1 | 11/2001 | Lotze |
| 6,341,359 B1 | 1/2002 | Aiken et al. |
| 6,349,238 B1 | 2/2002 | Gabbita et al. |
| 6,374,221 B1 | 4/2002 | Haimi-Cohen |
| 6,377,953 B1 | 4/2002 | Gawlick et al. |
| 6,378,128 B1 | 4/2002 | Edelstein et al. |
| 6,389,475 B1 | 5/2002 | Speakman et al. |
| 6,401,100 B1 | 6/2002 | Gladieux |
| 6,418,136 B1 | 7/2002 | Naor et al. |

(Continued)

OTHER PUBLICATIONS

U.S. Appl. No. 11/821,077, Jung et al.

(Continued)

*Primary Examiner* — Larry Donaghue

(57) ABSTRACT

A system, method, computer program product, and carrier are described for obtaining one or more potential recipient identifiers and one or more user indications of first content generation guidance and presenting second content generation guidance partly based on the one or more potential recipient identifiers and partly based on the one or more user indications of the first content generation guidance.

56 Claims, 25 Drawing Sheets

U.S. PATENT DOCUMENTS

| | | |
|---|---|---|
| 6,418,424 B1 | 7/2002 | Hoffberg et al. |
| 6,424,946 B1 | 7/2002 | Trischler et al. |
| 6,425,128 B1 | 7/2002 | Krapf et al. |
| 6,430,573 B1 | 8/2002 | Pachet et al. |
| 6,452,607 B1 | 9/2002 | Livingston |
| 6,480,885 B1 | 11/2002 | Olivier |
| 6,496,600 B1 | 12/2002 | Huang |
| 6,526,258 B2 | 2/2003 | Bejar et al. |
| 6,539,050 B1 | 3/2003 | Lee et al. |
| 6,539,376 B1 | 3/2003 | Sundaresan et al. |
| 6,546,005 B1 | 4/2003 | Berkley et al. |
| 6,549,950 B2 | 4/2003 | Lytle et al. |
| 6,560,576 B1 | 5/2003 | Cohen et al. |
| 6,564,321 B2 | 5/2003 | Bobo, II |
| 6,565,610 B1 | 5/2003 | Wang et al. |
| 6,570,850 B1 | 5/2003 | Gutierrez et al. |
| 6,574,744 B1 | 6/2003 | Kantz et al. |
| 6,594,630 B1 | 7/2003 | Zlokarnik et al. |
| 6,594,654 B1 | 7/2003 | Salam et al. |
| 6,594,672 B1 | 7/2003 | Lampson et al. |
| 6,614,551 B1 | 9/2003 | Peek |
| 6,621,892 B1 | 9/2003 | Banister et al. |
| 6,629,635 B1 | 10/2003 | Akamine |
| 6,633,868 B1 | 10/2003 | Min et al. |
| 6,662,223 B1 | 12/2003 | Zhang et al. |
| 6,678,360 B1 | 1/2004 | Katz |
| 6,690,390 B1 | 2/2004 | Walters et al. |
| 6,691,159 B1 | 2/2004 | Grewal et al. |
| 6,700,591 B1 | 3/2004 | Sharpe |
| 6,700,678 B1 | 3/2004 | Luman |
| 6,704,905 B2 | 3/2004 | Fukushige et al. |
| 6,711,291 B1 | 3/2004 | Stubler et al. |
| 6,724,373 B1 | 4/2004 | O'Neill, Jr. et al. |
| 6,725,229 B2 | 4/2004 | Majewski et al. |
| 6,748,320 B2 | 6/2004 | Jones |
| 6,751,593 B2 | 6/2004 | Tetsumoto |
| 6,772,396 B1 | 8/2004 | Cronin et al. |
| 6,775,358 B1 | 8/2004 | Breitenbach et al. |
| 6,785,341 B2 | 8/2004 | Walton et al. |
| 6,785,867 B2 | 8/2004 | Shaffer et al. |
| 6,788,308 B2 | 9/2004 | Reavy et al. |
| 6,804,224 B1 | 10/2004 | Schuster et al. |
| 6,810,422 B1 | 10/2004 | Cross |
| 6,813,043 B1 | 11/2004 | Mizuyama et al. |
| 6,813,507 B1 | 11/2004 | Gress et al. |
| 6,816,901 B1 | 11/2004 | Sitaraman et al. |
| 6,820,079 B1 | 11/2004 | Evans |
| 6,839,777 B1 | 1/2005 | Vrancic et al. |
| 6,842,860 B1 | 1/2005 | Branstad et al. |
| 6,850,988 B1 | 2/2005 | Reed |
| 6,851,049 B1 | 2/2005 | Price, III |
| 6,868,427 B2 | 3/2005 | Herzog et al. |
| 6,892,330 B2 | 5/2005 | Lee |
| 6,892,352 B1 | 5/2005 | Myers |
| 6,895,426 B1 | 5/2005 | Cortright et al. |
| 6,904,168 B1 | 6/2005 | Steinberg et al. |
| 6,904,183 B2 | 6/2005 | Slatter |
| 6,910,028 B2 | 6/2005 | Chan et al. |
| 6,910,033 B2 | 6/2005 | Rosenblum |
| 6,910,067 B1 | 6/2005 | Sitaraman et al. |
| 6,925,458 B2 | 8/2005 | Scaturro et al. |
| 6,934,889 B2 | 8/2005 | Owari |
| 6,934,916 B1 | 8/2005 | Webb et al. |
| 6,937,766 B1 | 8/2005 | Wilf et al. |
| 6,938,196 B2 | 8/2005 | Richardson et al. |
| 6,941,466 B2 | 9/2005 | Mastrianni |
| 6,941,513 B2 | 9/2005 | Meystel et al. |
| 6,947,068 B2 | 9/2005 | Forkner et al. |
| 6,947,948 B2 | 9/2005 | Wang et al. |
| 6,959,389 B1 | 10/2005 | Dunn et al. |
| 6,961,766 B2 | 11/2005 | Janosik, Jr. et al. |
| 6,981,023 B1 | 12/2005 | Hamilton et al. |
| 6,985,172 B1 | 1/2006 | Rigney et al. |
| 6,985,830 B2 | 1/2006 | Lee et al. |
| 6,987,840 B1 | 1/2006 | Bosik et al. |
| 6,990,525 B1 | 1/2006 | Ying et al. |
| 6,993,563 B2 | 1/2006 | Lytle et al. |
| 6,999,469 B1 | 2/2006 | Chu et al. |
| 7,006,827 B2 | 2/2006 | Masuda et al. |
| 7,010,616 B2 | 3/2006 | Carlson et al. |
| 7,020,651 B2 | 3/2006 | Ripley |
| 7,020,688 B2 | 3/2006 | Sykes, Jr. |
| 7,027,645 B2 | 4/2006 | Swift |
| 7,031,438 B1 | 4/2006 | Cheston, III et al. |
| 7,038,680 B2 | 5/2006 | Pitkow |
| 7,039,637 B2 | 5/2006 | Murray et al. |
| 7,054,421 B2 | 5/2006 | Kandlur et al. |
| 7,054,882 B2 | 5/2006 | Dockter et al. |
| 7,058,688 B2 | 6/2006 | Lin |
| 7,062,508 B2 | 6/2006 | Andreev et al. |
| 7,062,535 B1 | 6/2006 | Stark et al. |
| 7,072,901 B2 | 7/2006 | Teraguchi et al. |
| 7,072,942 B1 | 7/2006 | Maller |
| 7,076,485 B2 | 7/2006 | Bloedorn |
| 7,076,533 B1 | 7/2006 | Knox et al. |
| 7,080,384 B2 | 7/2006 | Wall et al. |
| 7,089,256 B2 | 8/2006 | Smialek |
| 7,089,497 B2 | 8/2006 | Abbott et al. |
| 7,095,855 B1 | 8/2006 | Collins |
| 7,103,154 B1 | 9/2006 | Cannon et al. |
| 7,107,291 B2 | 9/2006 | Nishikawa et al. |
| 7,110,664 B2 | 9/2006 | Yogeshwar et al. |
| 7,110,890 B2 | 9/2006 | Birkett et al. |
| 7,117,210 B2 | 10/2006 | DeSalvo |
| 7,119,923 B1 | 10/2006 | Iwaki |
| 7,120,628 B1 | 10/2006 | Conmy et al. |
| 7,124,302 B2 | 10/2006 | Ginter et al. |
| 7,130,887 B2 | 10/2006 | Goldberg |
| 7,133,880 B1 | 11/2006 | Nori et al. |
| 7,139,825 B2 | 11/2006 | Andaker et al. |
| 7,143,083 B2 | 11/2006 | Carlbom et al. |
| 7,143,140 B2 | 11/2006 | Dennis |
| 7,146,134 B2 | 12/2006 | Moon et al. |
| 7,146,234 B2 | 12/2006 | Woehler |
| 7,149,649 B2 | 12/2006 | Haft et al. |
| 7,149,780 B2 | 12/2006 | Quine et al. |
| 7,159,029 B2 | 1/2007 | Laarhuis et al. |
| 7,162,474 B1 | 1/2007 | Harker et al. |
| 7,162,515 B2 | 1/2007 | Engstrom |
| 7,164,921 B2 | 1/2007 | Owens et al. |
| 7,177,816 B2 | 2/2007 | Ehlen et al. |
| 7,181,694 B2 | 2/2007 | Reiss et al. |
| 7,191,117 B2 | 3/2007 | Kirby et al. |
| 7,191,252 B2 | 3/2007 | Redlich et al. |
| 7,194,656 B2 | 3/2007 | Hayward |
| 7,200,592 B2 | 4/2007 | Goodwin et al. |
| 7,200,678 B1 | 4/2007 | Bettadahalli et al. |
| 7,206,778 B2 | 4/2007 | Bode et al. |
| 7,209,880 B1 | 4/2007 | Gajic et al. |
| 7,212,807 B2 | 5/2007 | Laumen et al. |
| 7,213,260 B2 | 5/2007 | Judge |
| 7,224,778 B2 | 5/2007 | Aoki |
| 7,228,134 B2 | 6/2007 | Gandhi et al. |
| 7,228,334 B1 | 6/2007 | Jordan, Jr. |
| 7,233,803 B2 | 6/2007 | Nielsen et al. |
| 7,237,010 B2 | 6/2007 | Mora |
| 7,239,985 B1 | 7/2007 | Hysom et al. |
| 7,240,041 B2 | 7/2007 | Martin et al. |
| 7,240,355 B1 | 7/2007 | Eldering et al. |
| 7,242,421 B2 | 7/2007 | Center, Jr. et al. |
| 7,242,493 B2 | 7/2007 | Hall et al. |
| 7,242,988 B1 | 7/2007 | Hoffberg et al. |
| 7,243,130 B2 | 7/2007 | Horvitz et al. |
| 7,353,034 B2 | 4/2008 | Haney |
| 2001/0037311 A1 | 11/2001 | McCoy et al. |
| 2001/0039522 A1 | 11/2001 | Saxon |
| 2002/0035536 A1 | 3/2002 | Gellman |
| 2002/0069200 A1 | 6/2002 | Cooper et al. |
| 2002/0083118 A1 | 6/2002 | Sim |
| 2002/0147645 A1 | 10/2002 | Alao et al. |
| 2002/0178086 A1 | 11/2002 | Margeson et al. |
| 2002/0178224 A1 | 11/2002 | Kasajima |
| 2003/0054839 A1 | 3/2003 | Ono |
| 2003/0134616 A1 | 7/2003 | Thomsen et al. |
| 2003/0140235 A1 | 7/2003 | Immega et al. |
| 2003/0225850 A1 | 12/2003 | Teague |
| 2003/0236729 A1 | 12/2003 | Epstein et al. |

| | | |
|---|---|---|
| 2004/0030550 A1 | 2/2004 | Liu et al. |
| 2004/0117326 A1 | 6/2004 | Amato |
| 2004/0117501 A1 | 6/2004 | Day et al. |
| 2004/0139000 A1 | 7/2004 | Amos |
| 2004/0139314 A1 | 7/2004 | Cook et al. |
| 2004/0180668 A1 | 9/2004 | Owens et al. |
| 2004/0220705 A1 | 11/2004 | Basir et al. |
| 2004/0243844 A1 | 12/2004 | Adkins |
| 2005/0136903 A1* | 6/2005 | Kashima et al. ............. 455/418 |
| 2005/0136904 A1 | 6/2005 | Siddiqui |
| 2005/0154636 A1 | 7/2005 | Hildinger et al. |
| 2005/0177456 A1 | 8/2005 | Rossides |
| 2005/0186968 A1 | 8/2005 | Durst et al. |
| 2005/0188031 A1 | 8/2005 | Zandt |
| 2005/0188043 A1 | 8/2005 | Cortright et al. |
| 2005/0195076 A1 | 9/2005 | McCulloch et al. |
| 2005/0198054 A1 | 9/2005 | Sankaran |
| 2005/0233757 A1 | 10/2005 | Choi |
| 2005/0256769 A1 | 11/2005 | Rossides |
| 2006/0013368 A1 | 1/2006 | LaBaw |
| 2006/0018445 A1 | 1/2006 | Mittal |
| 2006/0078122 A1 | 4/2006 | Dacosta |
| 2006/0101514 A1 | 5/2006 | Milener et al. |
| 2006/0161457 A1 | 7/2006 | Rapaport et al. |
| 2006/0178949 A1 | 8/2006 | McGrath |
| 2007/0070979 A1 | 3/2007 | Kim et al. |
| 2007/0262861 A1 | 11/2007 | Anderson et al. |
| 2008/0010106 A1 | 1/2008 | Bourne et al. |
| 2008/0030322 A1 | 2/2008 | Stauffer et al. |
| 2008/0070593 A1 | 3/2008 | Altman et al. |
| 2008/0168074 A1 | 7/2008 | Inagaki |
| 2008/0214142 A1 | 9/2008 | Morin et al. |

OTHER PUBLICATIONS

U.S. Appl. No. 11/821,101, Jung et al.

U,S, Appl. No. 11/821,122, Jung et al.

"Called-Party Camp-On"; Wikipedia, The Free Encyclopedia; bearing a date of Mar. 20, 2007; printed on Apr. 2, 2007; p. 1; located at: http://en.wikipedia.org/wiki/Called-party_camp-on.

FutureMe.org; bearing a date of Jan. 22, 2006; printed on Apr. 2, 2007; pp. 1-3; located at: http://futureme.org/public.php?id=218620.

Huang, Dawei; Liu, Fang; Shi, Xiangdong; Yang, Guangxin; Zheng, Ludi; Zhou, Zhiyu; "MapWeb: A Location-Based Converged Communications Platform"; Bell Labs Technical Journal; bearing a date of 2006; pp. 159-171; vol. 11, No. 1; Wiley Periodicals, Inc.; located at; www.interscience.wiley.com.

"Intro Writing Do's | Don'ts"; Happen Magazine—Match.com's advice center; printed on Apr. 4, 2007; pp. 1-2; located at: http://www.match.com/matchscene/tips.aspx?articleid=4511.

Khan, Omar; "Context and Context-Aware Computing"; Fall 2006; pp. 1-40; CS260.

McKinley, Philip K.; Padmanabhan, Udiyan I.; Ancha, Nandagopal; Sadjadi, Seyed Masoud; "Composable Proxy Services to Support Collaboration on the Mobile Internet"; IEEE Transactions on Computers; bearing a date of Jun. 2003; pp. 713-726; Vol. 52, No. 6; IEEE Computer Society.

McKinley, Philip K.; Sadjadi, Seyed Masoud; Kasten, Eric P.; Cheng, Betty H.C.; "A Taxonomy of Compositional Adaptation"; Technical Report MSU-CSE-04/17; bearing a date of May 2004 and Jul. 2004; pp. 1-48; located at: http://www.cse.msu.edu/rapidware/survey.

Morris, John; Peterson, Jon; "Who's Watching You Now?"; IEEE Security & Privacy: Building Confidence in a Networked World; bearing a date of Jan.-Feb. 2007; pp. 76-79; vol. 5, No. 1; IEEE Computer Society.

"Oops!"; Match.com—Find Singles at the World's Largest Online Dating Personals Service; printed on Apr. 4, 2007; pp. 1-3; located at: http://www.match.com/profile/myprofile.aspx?sect=6.

"Open Source Rule Engines Written in Java"; Manageability; printed on May 2, 2007; pp. 1-7; located at: http://www.manageability.org/blog/stuff/rule_engines/view.

*Star Wars IV: A New Hope*; Dir. George Lucas; Perf. Mark Hamill, Harrison Ford, Carrie Fisher, Peter Cushing, Alec Guinness; Twentieth Century Fox; 1977 (submitted via DVD).

Teridiman, Daniel; "A Cure for E-mail Disorder?"; CNET News.com; bearing a date of Feb. 28, 2007; pp. 1-8; located at: http://news.com/A+cure+for+e-mail+attention+disorder/2100-.

Van Grove, Jennifer; "Can a Gmail Tool Make Us More Considerate Email Senders?"; Mashable; printed on Jun. 8, 2011; pp. 1-3; located at: http://mashable.com/2011/06/07/courteously/.

* cited by examiner

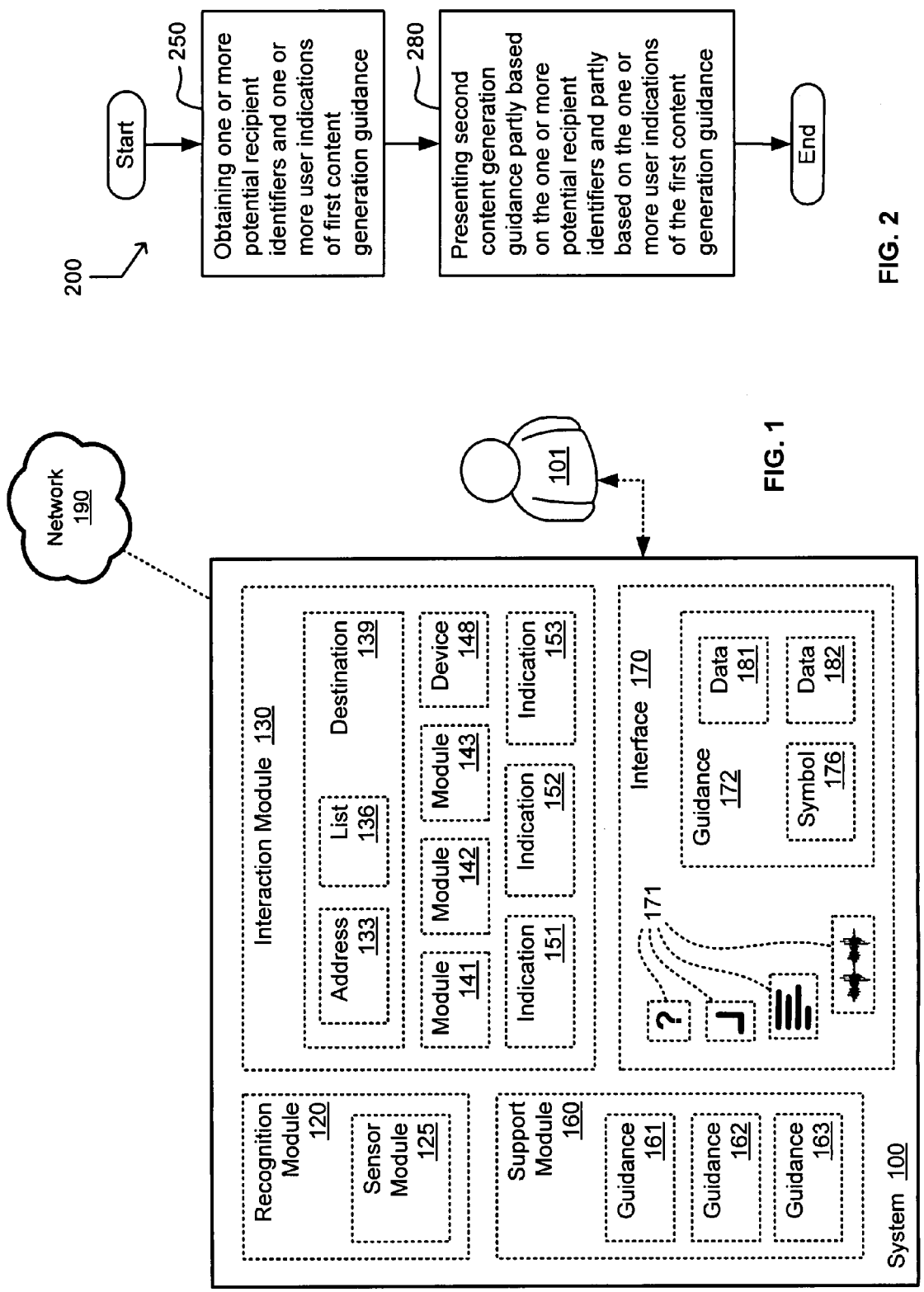

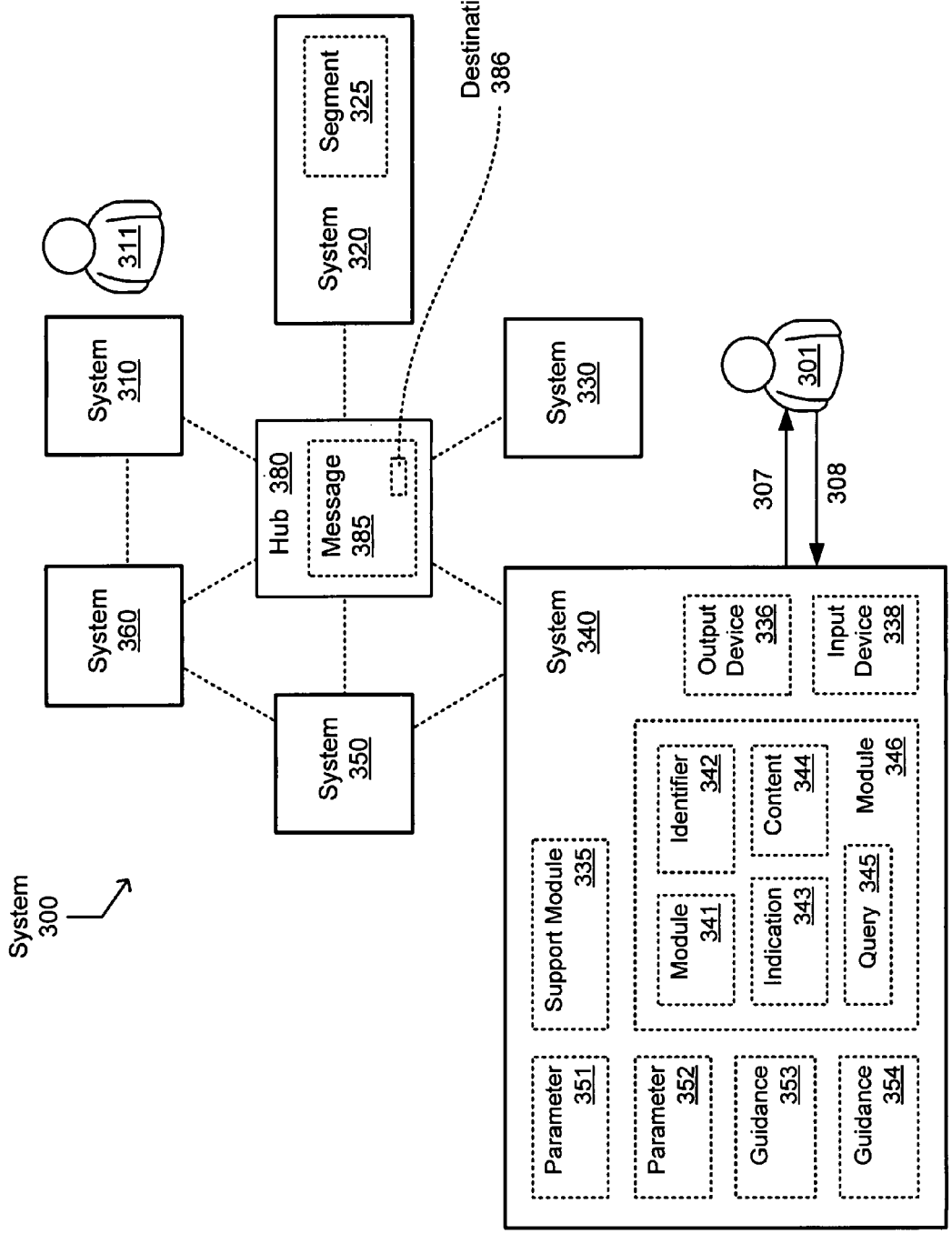

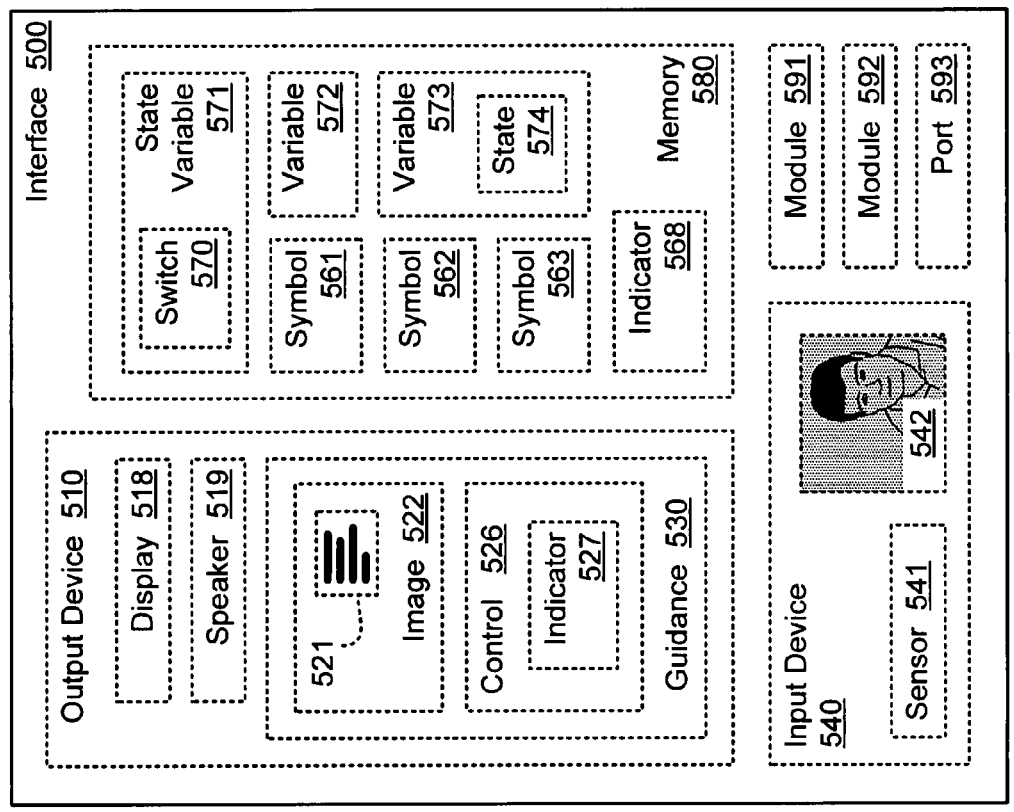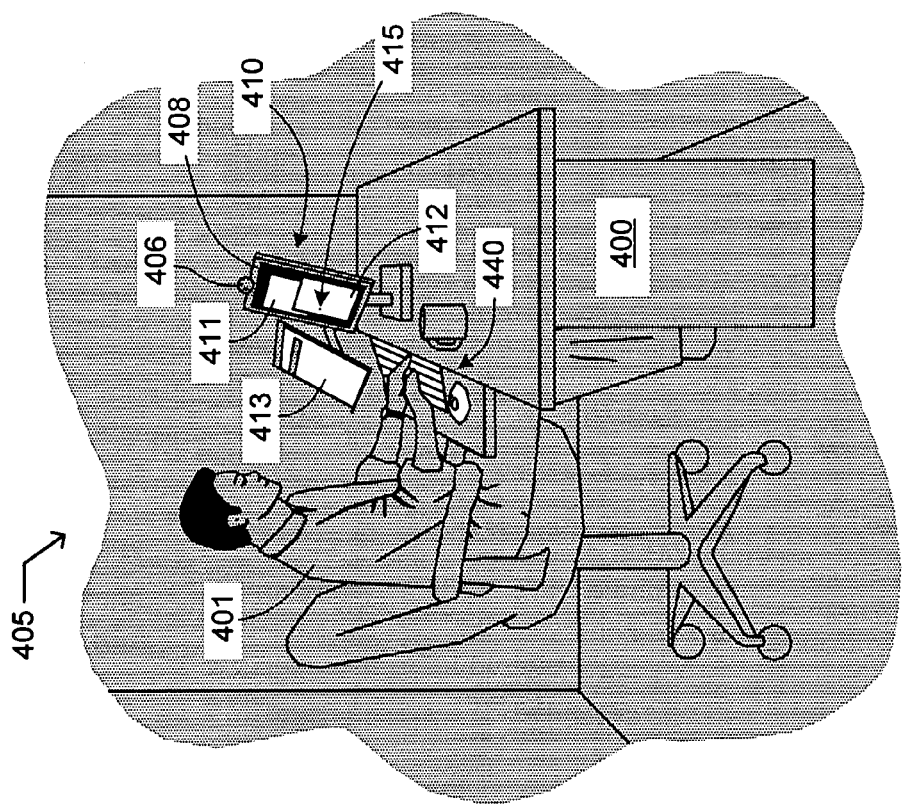

LAYERING DESTINATION-DEPENDENT CONTENT HANDLING GUIDANCE

SUMMARY

In one aspect, a method includes but is not limited to obtaining one or more potential recipient identifiers and one or more user indications of first content generation guidance and presenting second content generation guidance partly based on the one or more potential recipient identifiers and partly based on the one or more user indications of the first content generation guidance. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect, a system includes but is not limited to circuitry for obtaining one or more potential recipient identifiers and one or more user indications of first content generation guidance and circuitry for presenting second content generation guidance partly based on the one or more potential recipient identifiers and partly based on the one or more user indications of the first content generation guidance. In addition to the foregoing, other system aspects are described in the claims, drawings, and text forming a part of the present disclosure.

In addition to the foregoing, various other method and/or system and/or program product and/or physical carrier aspects are set forth and described in the teachings such as text (e.g., claims and/or detailed description) and/or drawings of the present disclosure.

The foregoing is a summary and thus contains, by necessity, simplifications, generalizations and omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

FIG. 1 depicts an exemplary environment in which one or more technologies may be implemented.

FIG. 2 depicts a high-level logic flow of an operational process.

FIGS. 3-25 depict various environments in which one or more technologies may be implemented.

DETAILED DESCRIPTION

Figure 6:
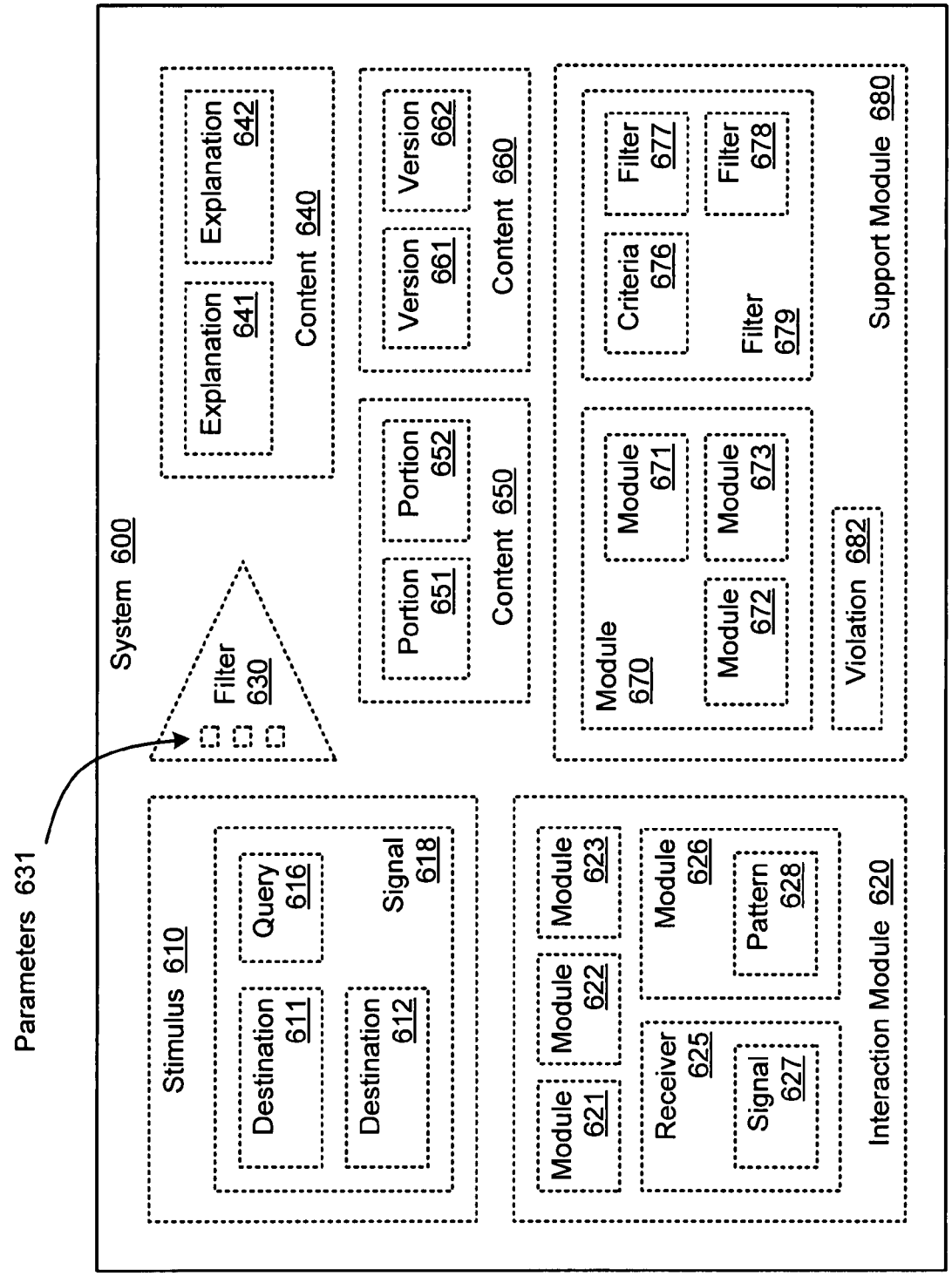

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In the following detailed description, reference is made to the accompanying drawings, which form a part hereof. The use of the same symbols in different drawings typically indicates similar or identical items. The illustrative embodiments described in the detailed description, drawings, and claims are not meant to be limiting. Other embodiments may be utilized, and other changes may be made, without departing from the spirit or scope of the subject matter presented here.

Following are a series of systems and flowcharts depicting implementations of processes. For ease of understanding, the flowcharts are organized such that the initial flowcharts present implementations via an initial "big picture" viewpoint and thereafter the following flowcharts present alternate implementations and/or expansions of the "big picture" flowcharts as either sub-steps or additional steps building on one or more earlier-presented flowcharts. Those having skill in the art will appreciate that the style of presentation utilized herein (e.g., beginning with a presentation of a flowchart(s) presenting an overall view and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

With reference now to FIG. 1, shown is an example of a system that may serve as a context for introducing one or more processes and/or devices described herein. As shown system 100 may (optionally) include one or more instances of sensor modules 125 or other recognition modules 120, interaction modules 130, support modules 160, or interfaces 170 operable for interacting with user 101 or network 190. Interaction module 130 may comprise one or more instances of addresses 133, lists 136, or other destinations 139; modules 141, 142, 143; devices 148; or indications 151, 152, 153. Support module 160 may comprise one or more instances of guidance 161, 162, 163. Interface 170 comprises one or more instances of guidance 171, 172 such as symbols 176 or other data 181, 182.

With reference now to FIG. 2, there is shown a high-level logic flow 200 of an operational process. Flow 200 includes operation 250—obtaining one or more potential recipient identifiers and one or more user indications of first content generation guidance (e.g. interaction module 130 at least invoking module 142 for receiving one or more instances of addresses 133 or other destinations 139 as well as module 143 for detecting or otherwise obtaining one or more user interest indications 152, 153 relating to guidance 172). This may occur, for example, in a context in which guidance 172 includes one or more lines, transitions, sounds, language, or other symbols 176 suggesting or otherwise representing advice or other data 181, 182 that may facilitate content aggregation, filtering, composition, editing, or some other aspect of content generation. In some variants, for example, such data 181 may be expressed as a color transition, a warning sound suggesting proximity to a threshold, or some other guidance 171 indicating that additional information is available in relation to a user's current context. Module 143 may be configured to receive one or more user interest indications 152 as a signal of a stylus, menu option, keyboard, or other selection device 148 indicating guidance 172 directly. Alternatively or additionally, module 143 may be configured to receive user interest indication(s) 152 via a pattern recognition module 120 operable for detecting words, gestures, or other expressions in output received from a camera, microphone, or other element of sensor module 125.

Flow 200 further includes operation 280—presenting second content generation guidance partly based on the one or more potential recipient identifiers and partly based on the one or more user indications of the first content generation guidance (e.g. support module 160 outputting selected identifier-dependent guidance 161 to interface 170 according to which guidance 171, 172 was indicated most recently or most clearly). This may occur, for example, in an embodiment in which support module 160 is configured to select supplemental guidance 162 in response to one or more user indications of corresponding guidance 172, for example. Alternatively or additionally, other guidance 161 may be presented as a direct or indirect result of user 101 having indicated (other) guidance 171 corresponding thereto. In some variants, for example, guidance 161 may comprise a spoken or written explanation in response to user 101 asking "What is _____?" in relation to guidance 171. The form of guidance 161, 163 may vary in response to a default value or any potential recipient identifiers of destination 139, for example, by obtaining guidance 163 or other portions of support module 160 from respective systems of network 190.

With reference now to FIG. 3, shown is another example of a system that may serve as a context for introducing one or more processes and/or devices described herein. As shown system 300 may comprise one or more hubs 380 or other systems 310, 320, 330, 340, 350, 360, some of which may be accessible to users 301, 311 as shown. System 320 may access or otherwise include one or more segments 325 as described below. System 340 may comprise one or more instances of output devices 336 operable for presenting output 307 to user 301; input devices 338 operable to for receiving input 308 from user 301; identifiers 342, indications 343, content 344, queries 345, or other modules 341, 346; support module 335; or parameters 351, 352 or guidance 353, 354. Hub 380 may bear or otherwise comprise one or more instances of messages 385, each optionally including one or more destinations 386.

With reference now to FIG. 4, shown is another example of a system that may serve as a context for introducing one or more processes and/or devices described herein. User 401 is shown in an environment 405 of a workstation 400 comprising one or more instances of microphones, cameras, or other sensors 406; display images 408 comprising one or more shapes 415 in portions 411, 412; output devices 410; documents or other material 413; input devices 440; or the like.

With reference now to FIG. 5, shown is another example of a system that may serve as a context for introducing one or more processes and/or devices described herein. Interface 500 may represent a portion of a workstation like that of FIG. 4 schematically, and may comprise one or more instances of output devices 510, input devices 540, memories 580, modules 591, 592, or port 593. Output device 510 may comprise one or more instances of displays 518, speakers 519, text 521 or other portions of image 522, indicators 527 or other controls 526, or other guidance 530. Input device 540 may comprise one or more cameras or other sensors 541, of which some may be operable for handling streaming video or other image data signals 542. Memory 580 may include one or more instances of switches 570 or other state variables 571; symbols 561, 562, 563; variables 572, 573 such as state 574; or other indicators 568.

With reference now to FIG. 6, shown is another example of a system that may serve as a context for introducing one or more processes and/or devices described herein. System 600 may comprise one or more instances of stimuli 610, interaction modules 620, filters 630 (optionally with one or more parameters 631), content 640, 650, 660, or support modules 680. Stimulus 610 may comprise one or more instances of destinations 611, 612, queries 616, or other signals 618. Interaction module 620 may include one or more instances of receivers 625 (optionally operable for handling one or more signals 627) or other modules 621, 622, 623, 626 (optionally operable for handling one or more patterns 628). Content 640 may include one or more explanations 641, 642. Content 650 may include one or more portions 651, 652. Content 660 may include one or more versions 661, 662. Support module 680 may manifest or otherwise comprise one or more nested or other instances of modules 670, 671, 672, 673; implementations of one or more criteria 676 or filters 677, 678, 679; or apparent violations 682 of such criteria.

Figure 7:
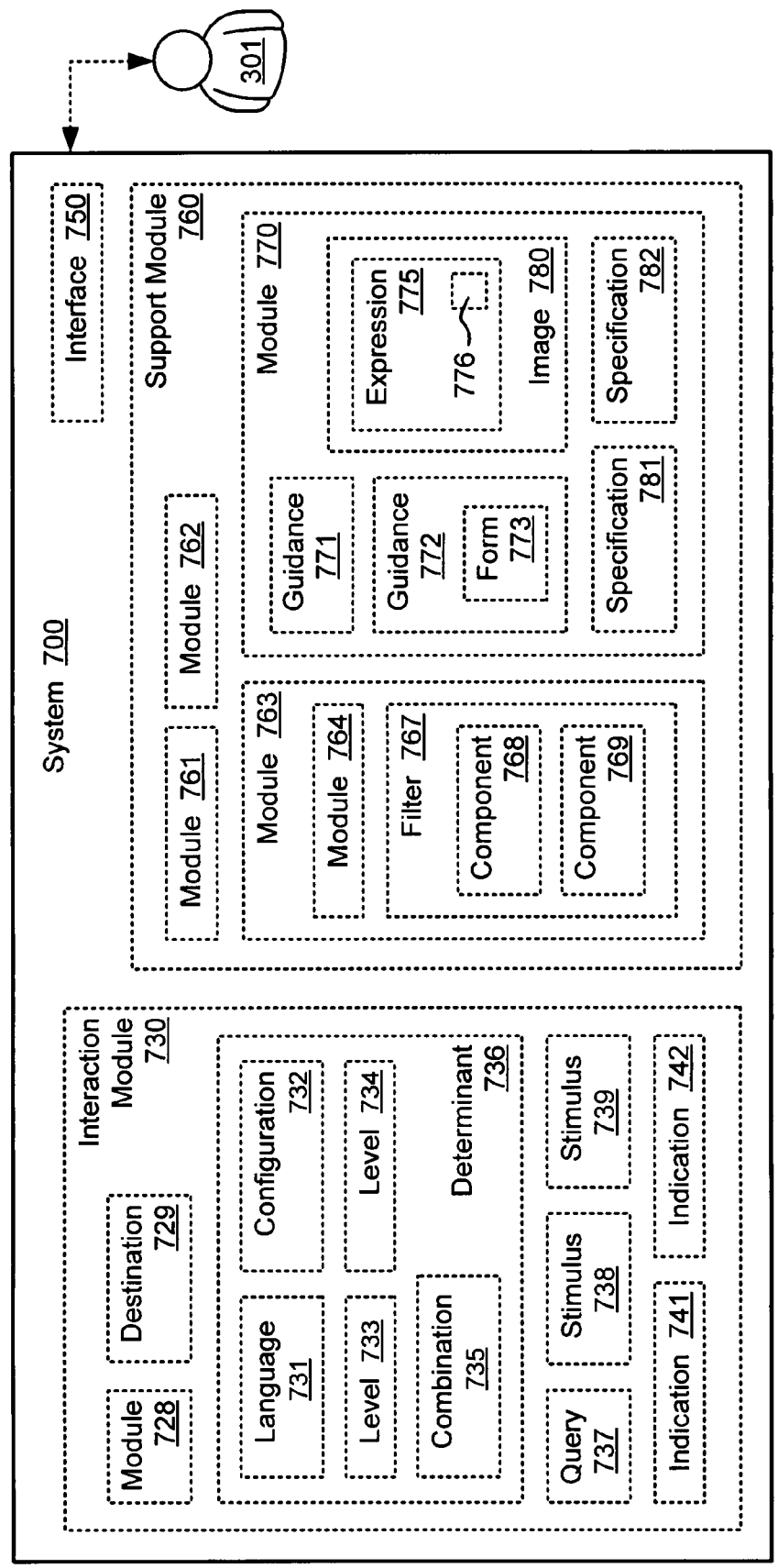

With reference now to FIG. 7, shown is another example of a system that may serve as a context for introducing one or more processes and/or devices described herein. System 700 may comprise one or more instances of interaction modules 730, interfaces 750 (accessible, for example, by user 301 of FIG. 3), or support modules 760. Interaction module 730 may comprise one or more instances of modules 728, destinations 729, determinants 736, queries 737, stimuli 738, 739 or indications 741, 742. Determinant 736 may optionally include one or more instances of (indicators of) languages 731, configurations 732, levels 733, 734, or combinations 735 of these. Support module 760 may comprise one or more instances of modules 761, 762, 763, 770. Module 763 may comprise one or more instances of nested modules 764 or filters 767 (optionally containing one or more components 768, 769). Module 770 may comprise one or more instances of guidance 771, 772 (optionally having one or more specific forms 773), images 780, or specifications 781, 782. Image 780 may comprise one or more instances of controls 776 or other expressions 775.

Figure 8:
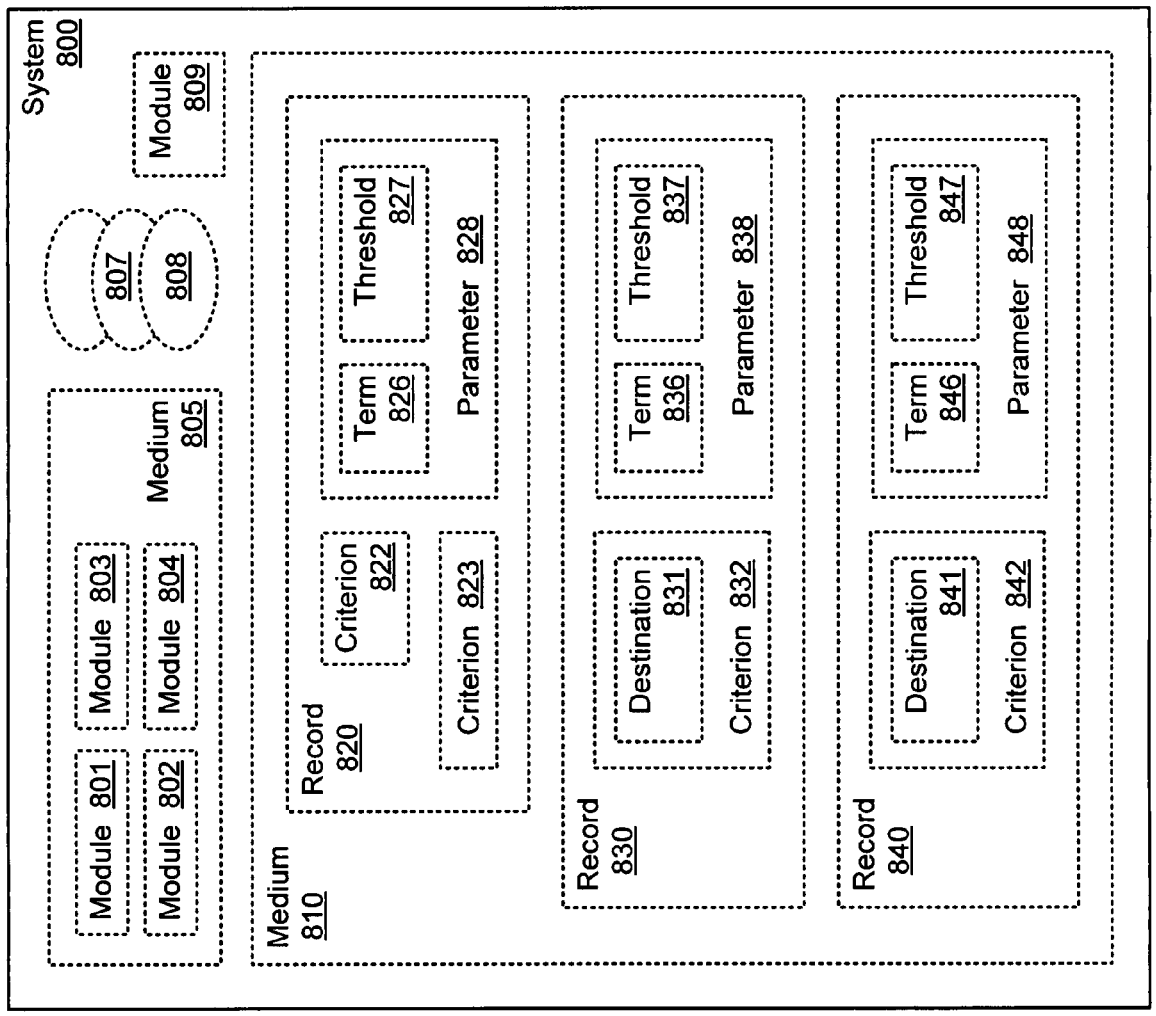

With reference now to FIG. 8, shown is another example of a system that may serve as a context for introducing one or more processes and/or devices described herein. System 800 may comprise one or more instances of content portions 807, 808 or modules 809 in various forms as well as semiconductor chips, waveguides, or storage or other media 805, 810. (In some embodiments, for example, such content or modules as described herein may include special-purpose software, special-purpose hardware, or some combination thereof, optionally in conjunction with writeable media, processors, or other general-purpose elements.) Medium 805 may, for example, comprise one or more instances of modules 801, 802, 803, 804. Medium 810 may likewise contain one or more records 820, 830, 840. Record 820 may include one or more instances of criteria 822, 823, terms 826, thresholds 827, or other parameters 828. Record 830 may similarly include one or more instances of destinations 831 or other criteria 832, terms 836, thresholds 837, or other parameters 838. Record 840 may likewise include one or more instances of destinations 841 or other criteria 842, terms 846, thresholds 847, or other parameters 848.

Figure 9:
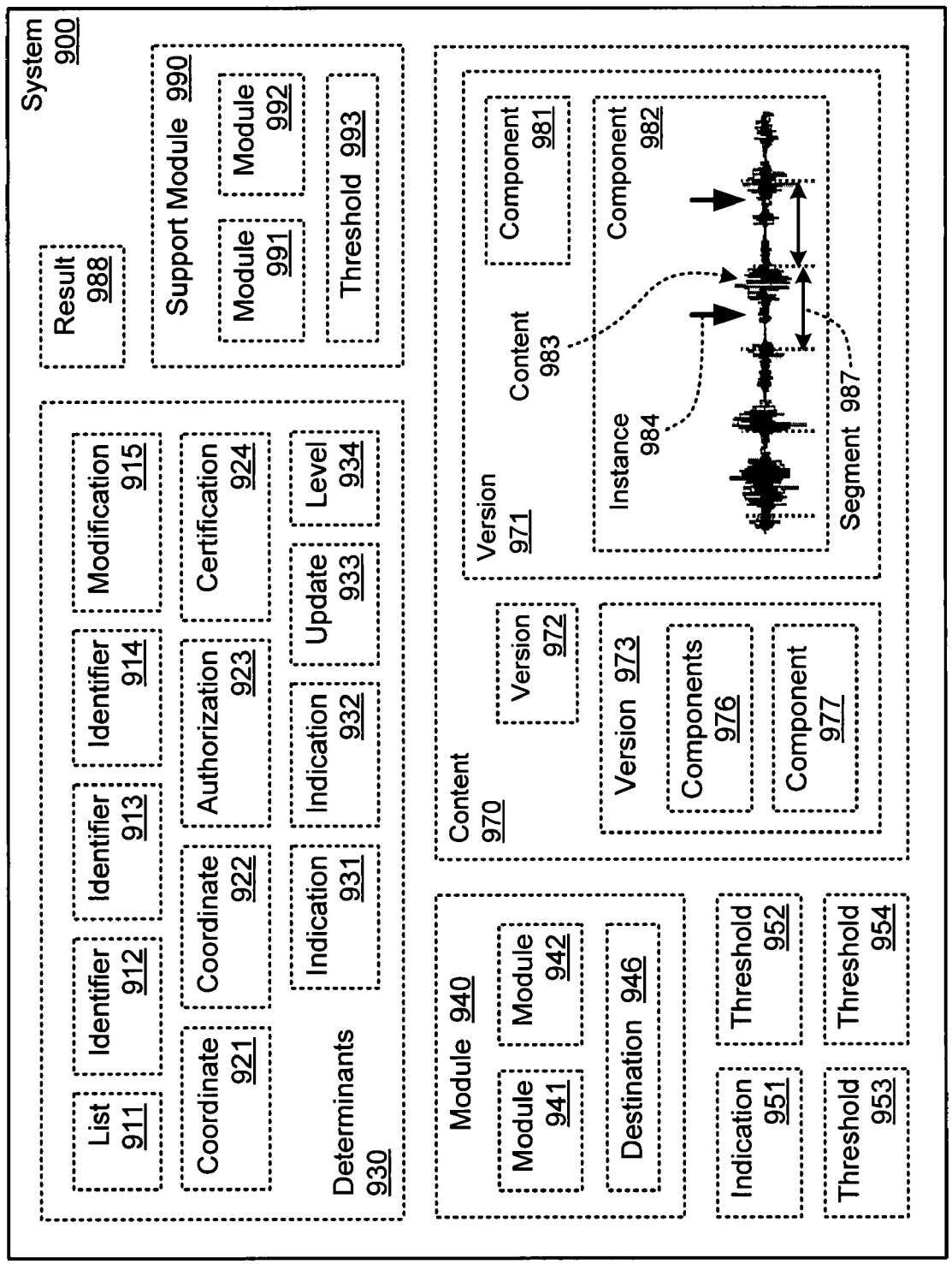

With reference now to FIG. 9, shown is another example of a system that may serve as a context for introducing one or more processes and/or devices described herein. System 900 may comprise one or more instances of determinants 930, modules 940, thresholds 952, 953, 954 or other indications 951, content 970, results 988, or support modules 990. The one or more determinants 930 may (if included) comprise one or more instances of lists 911 or other identifiers 912, 913, 914; modifications 915; coordinates 921, 922; authorizations 923; certifications 924; or updates 933, levels 934, or other indications 931, 932. Module 940 may (if included) comprise one or more instances of destinations 946 or other modules 941, 942. Content 970 may comprise one or more instances of versions 971, 972, 973 (of the same message or different messages, for example) that may each include one or more components 976, 977, 981, 982. Component 982, for example, may comprise auditory content 983 including one or more segments 987 including or overlapping one or more instances of phrases or other patterns. Support module 990 may comprise one or more instances of thresholds 993 or other modules 991, 992.

Figure 10:
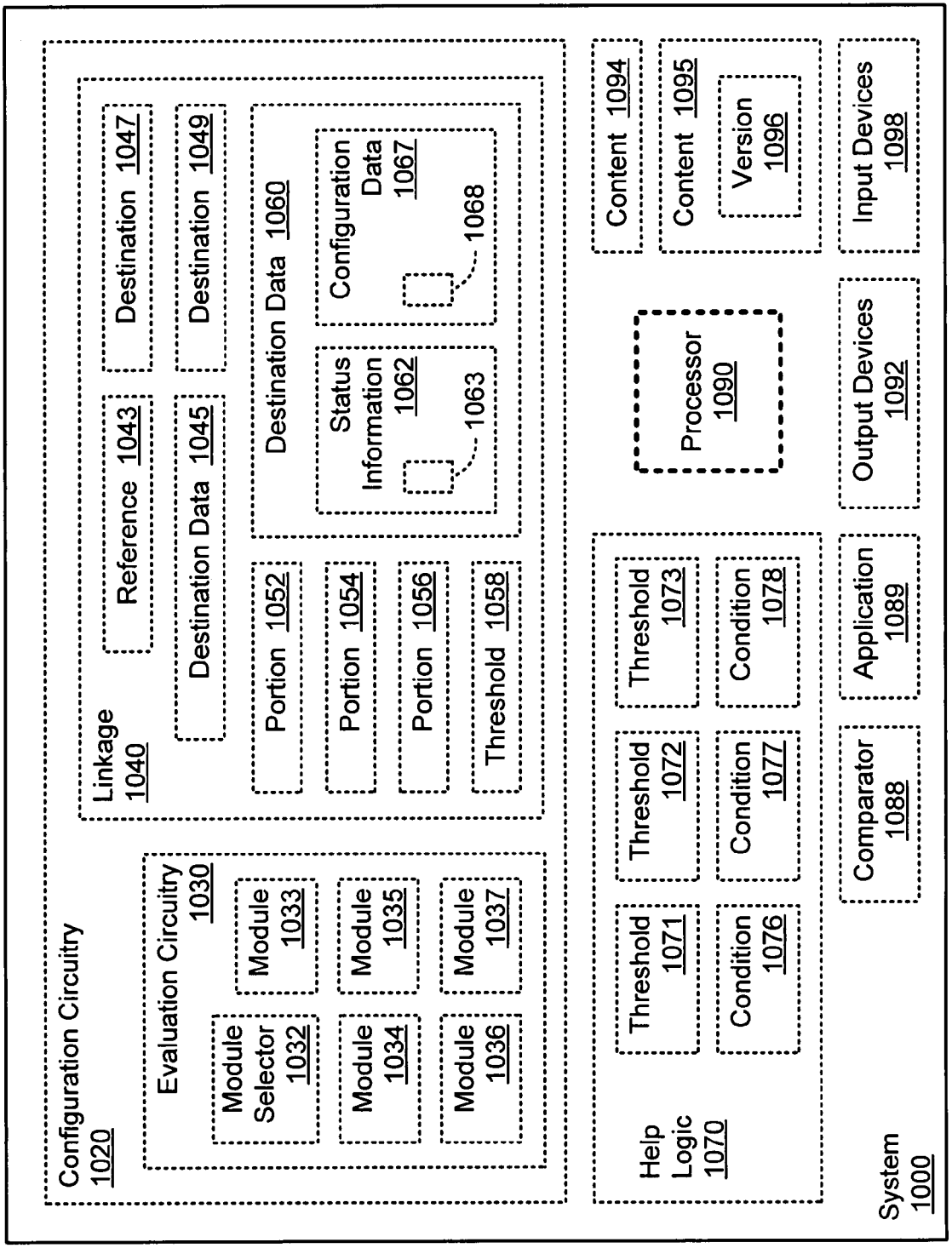

With reference now to FIG. 10, shown is another example of a system that may serve as a context for introducing one or more processes and/or devices described herein. System 1000 may comprise one or more instances of configuration circuitry 1020, help logic 1070, comparators 1088, applications 1089, processors 1090, output devices 1092, content 1094, 1095 (optionally with one or more versions 1096), or input devices 1098. Configuration circuitry 1020 may comprise one or more instances of evaluation circuitry 1030 or linkages 1040. Evaluation circuitry 1030 may comprise one or more instances of modules 1033, 1034, 1035, 1036, 1037 or module selectors 1032. Linkage 1040 may comprise one or more instances of references 1043; destination data 1045; destinations 1047, 1049; portions 1052, 1054, 1056; thresholds 1058; or destination data 1060. Destination data 1060 may comprise one or more instances of bits 1063 or other status information 1062 or of bits 1068 or other configuration data 1067. Help logic 1070 may comprise one or more thresholds 1071, 1072, 1073 or conditions 1076, 1077, 1078.

Figure 11:
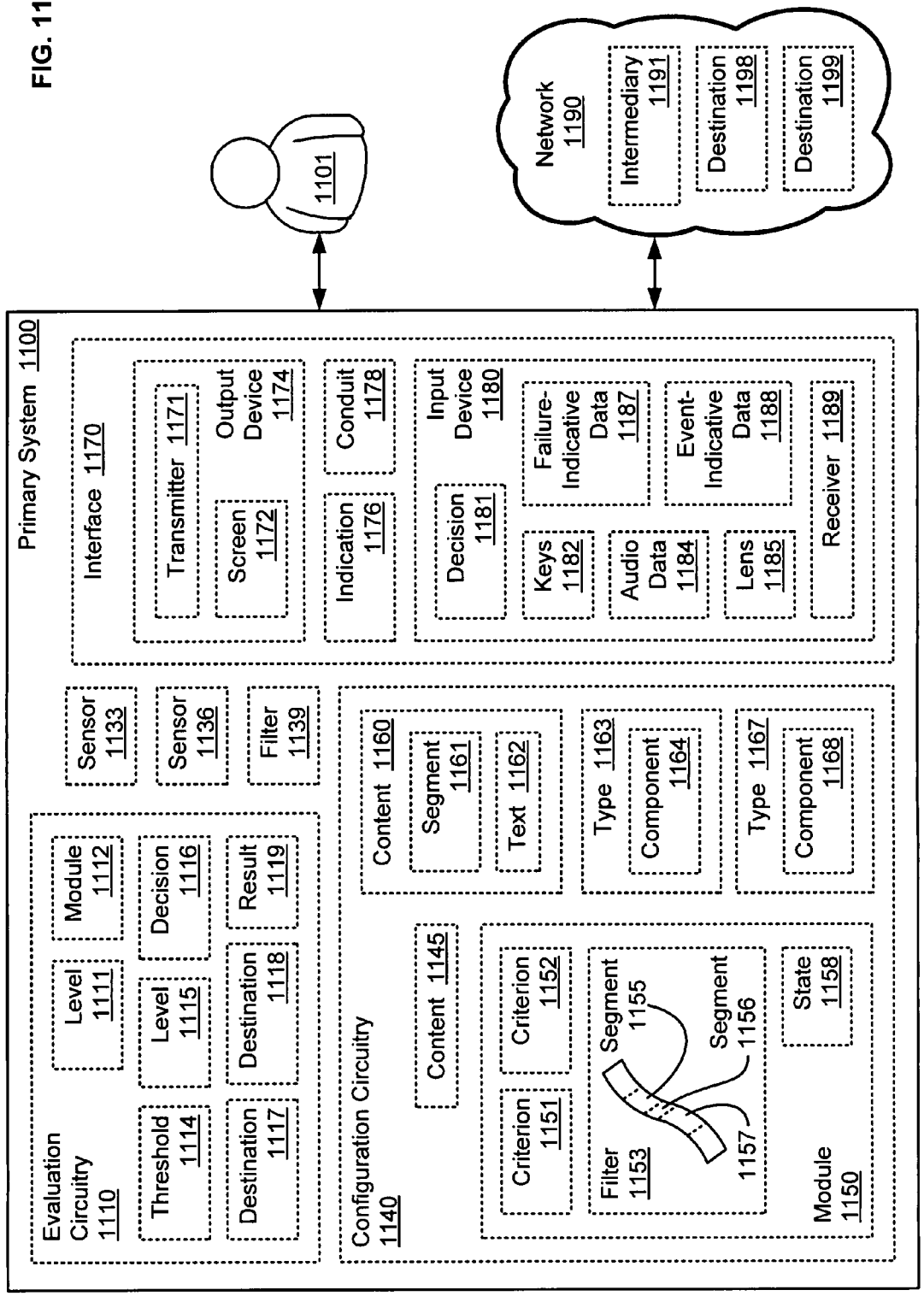

With reference now to FIG. 11, shown is another example of a system that may serve as a context for introducing one or more processes and/or devices described herein. Primary system 1100 may comprise one or more instances of evaluation circuitry 1110, sensors 1133, 1136, filters 1139, configuration circuitry 1140, or interfaces 1170 operable for interacting with one or more users 1101 or networks 1190. Evaluation circuitry 1110 may comprise one or more instances of hardware and/or software modules 1112, levels 1111, 1115, thresholds 1114, decisions 1116, destinations 1117, 1118, or results 1119. Configuration circuitry 1140 may comprise one or more instances of modules 1150; text 1162 and other segments 1161 of content 1145, 1160; and one or more components 1164, 1168 each of one or more respective types 1163, 1167. Module 1150 may comprise one or more instances of criteria 1151, 1152 such as may implement one or more filters 1153 operable on sequences of respective segments 1155, 1156, 1157 as shown, and states 1158. Interface 1170 may comprise one or more instances of output devices 1174, input devices 1180, or other conduits 1178 operable for bearing indications 1176 or the like. Output device 1174 may comprise one or more instances of transmitters 1171 or screens 1172. Input device 1180 may similarly bear or otherwise comprise one or more instances of decisions 1181, buttons or keys 1182 (of a mouse or keyboard, for example), audio data 1184, lens 1185, failure-indicative data 1187 or other event-indicative data 1188, or receivers 1189. Network 1190 may access or otherwise comprise one or more instances of intermediaries 1191 or destinations 1198, 1199.

Figure 12:
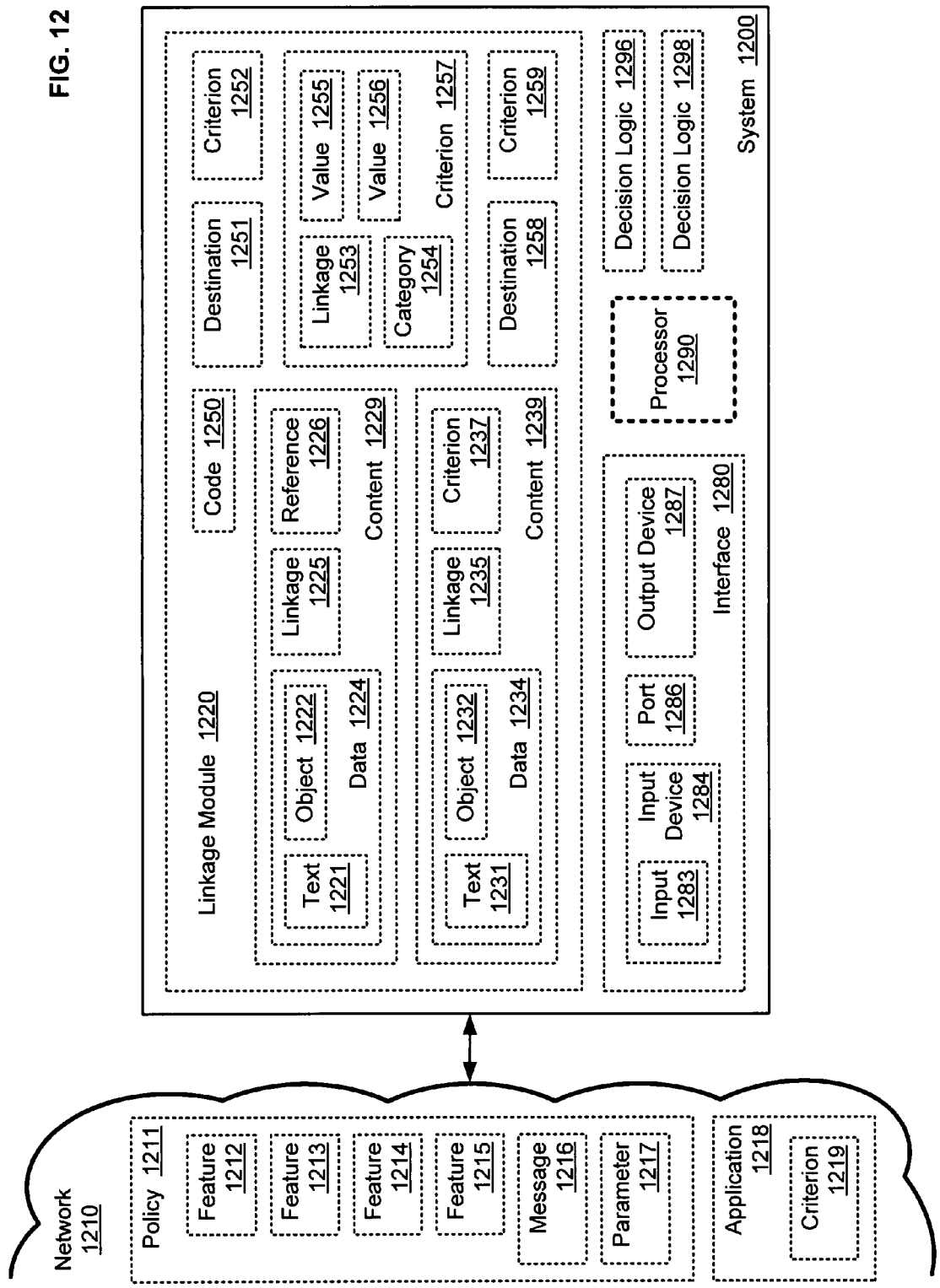

With reference now to FIG. 12, shown is another example of a system that may serve as a context for introducing one or more processes and/or devices described herein. System 1200 may operably couple with one or more networks 1210 as shown, and may comprise one or more instances of linkage modules 1220, interfaces 1280, processors 1290, or decision logic 1296, 1298. Network 1210 may comprise one or more instances of applications 1218 or other circuitry operable for implementing one or more criteria 1219 or other policies 1211. Policy 1211 may comprise one or more instances of features 1212, 1213, 1214, 1215; messages 1216; or other parameters 1217. Linkage module 1220 may comprise memory or special-purpose elements containing or otherwise comprising one or more instances of content 1229, 1239; codes 1250, destinations 1251, 1258; or criteria 1252, 1257, 1259. Content 1229 may comprise one or more instances of text 1221 or other objects 1222 of data 1224, linkages 1225, or other references 1226. Content 1239 may similarly comprise one or more instances of linkages 1235 or criteria 1237 as well as text 1231 or other objects 1232 of data 1234. Criterion 1257 may comprise one or more instances of linkages 1253, categories 1254, or other values 1255, 1256. Interface 1280 may comprise one or more instances of input 1283 (optionally borne by one or more input devices 1284), ports 1286, or output devices 1287.

Figure 13:
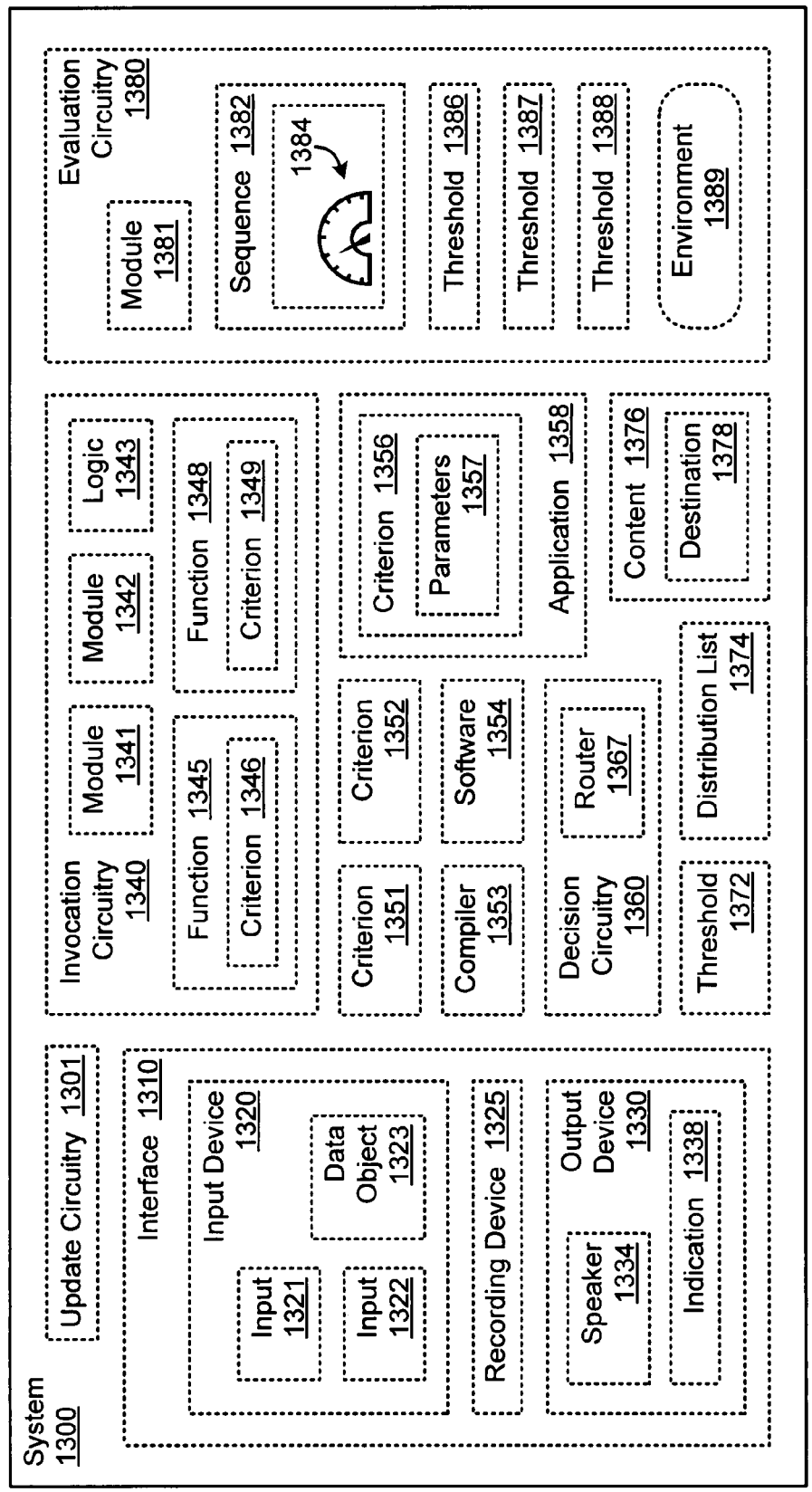

With reference now to FIG. 13, shown is another example of a system that may serve as a context for introducing one or more processes and/or devices described herein. System 1300 may comprise one or more instances of update circuitry 1301, interfaces 1310, invocation circuitry 1340, criteria 1351, 1352, compilers 1353, software 1354, applications 1358, routers 1367 or other decision circuitry 1360, thresholds 1372, distribution lists 1374, destinations 1378 or other content 1376, or evaluation circuitry 1380. Interface 1310 comprises one or more instances of input devices 1320, recording devices 1325, or output devices 1330. Input device 1320 may, for example, be operable for bearing one or more instances of inputs 1321, 1322 or other data objects 1323. One or more speakers 1334 or other output devices 1330 may similarly be operable for bearing one or more such data objects or other indications 1338. Invocation circuitry 1340 may comprise one or more instances of modules 1341, 1342, logic 1343, or functions 1345, 1348 each operable for applying one or more criteria 1346, 1349. Application 1358 may similarly comprise one or more instances of parameters 1357 operable for controlling the behavior of one or more criteria 1356. Evaluation circuitry 1380 may comprise one or more instances of modules 1381, sequences 1382 (optionally providing output 1384), thresholds 1386, 1387, 1388, or environments 1389.

Figure 14:
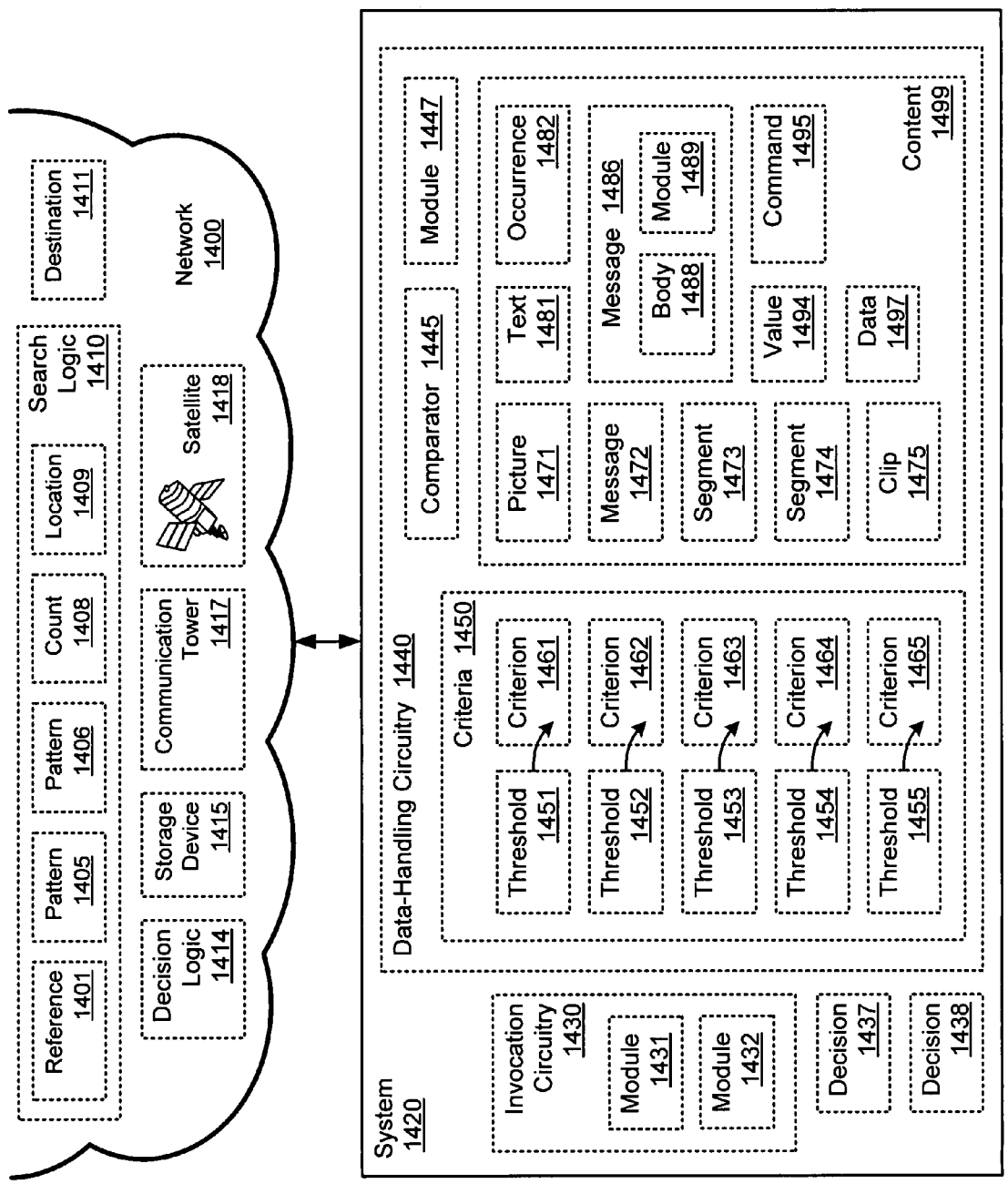

With reference now to FIG. 14, shown is another example of a system that may serve as a context for introducing one or more processes and/or devices described herein. Network 1400 may comprise one or more instances of search logic 1410, destinations 1411, decision logic 1414, storage devices 1415, communication towers 1417, or satellites 1418. Search logic 1410 may comprise one or more instances of references 1401, patterns 1405, 1406, counts 1408, or locations 1409. As shown, network 1400 may operably couple with one or more instances of system 1420, which comprises one or more instances of modules 1431, 1432 or other invocation circuitry 1430, decisions 1437, 1438, or data-handling circuitry 1440. Data-handling circuitry 1440 may comprise one or more instances of comparators 1445, modules 1447, criteria 1450, or content 1499. Such criteria 1450 may comprise one or more instances of thresholds 1451, 1452, 1453, 1454, 1455 each operable with a respective one or more criteria 1461, 1462, 1463, 1464, 1465. Content 1499 may comprise one or more instances of pictures 1471, messages 1472, segments 1473, 1474, clips 1475, text 1481 or other occurrences 1482, messages 1486, values 1494, commands 1495, or data 1497. The message(s) 1486 may comprise one or more instances of bodies 1488 or other modules 1489.

Figure 15:
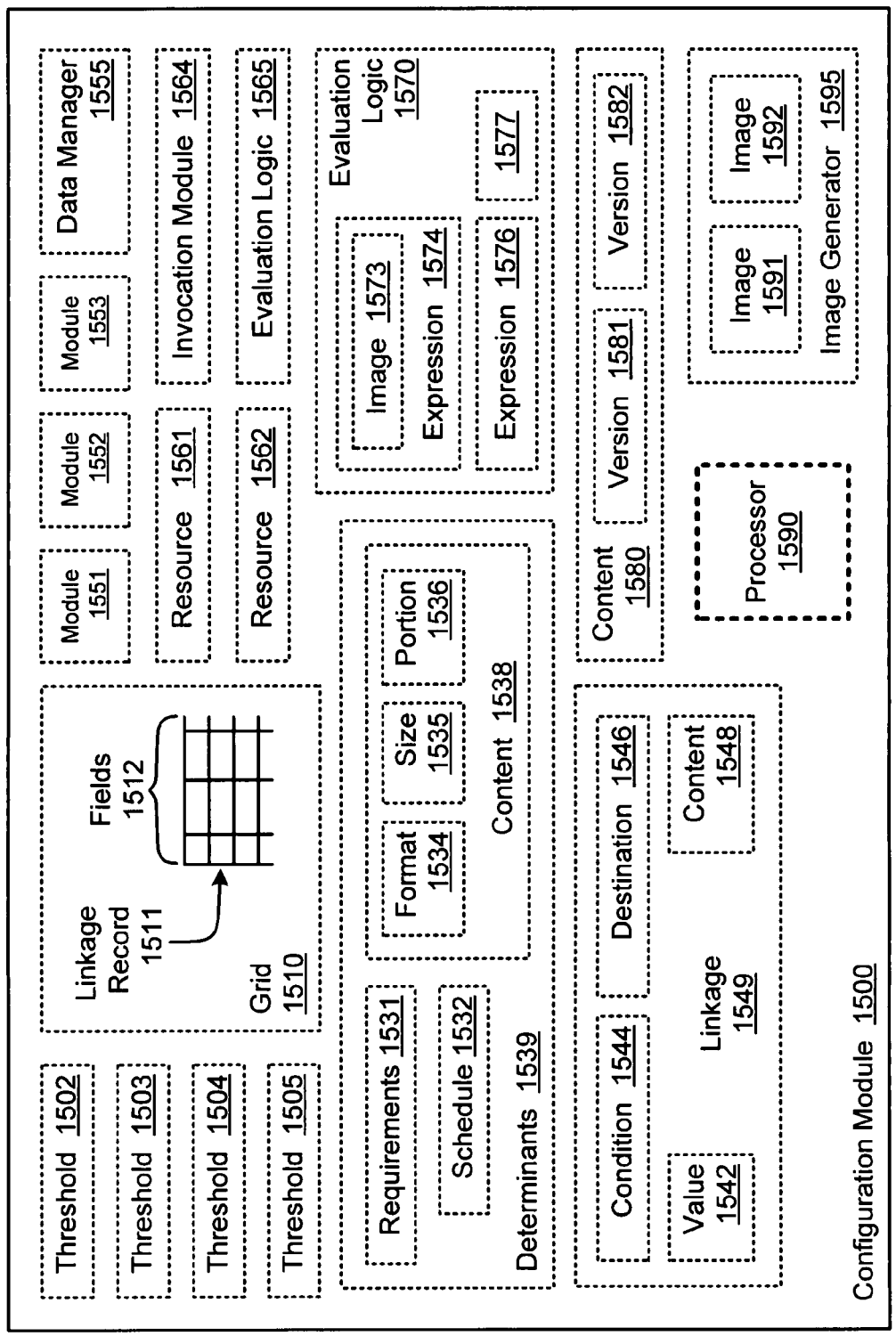

With reference now to FIG. 15, shown is another example of a system that may serve as a context for introducing one or more processes and/or devices described herein. Configuration module 1500 may include one or more instances of thresholds 1502, 1503, 1504, 1505 and/or grids 1510 or other data arrangements comprising linkage records 1511 having one or more fields 1512. Configuration module 1500 may further include one or more instances of requirements 1531, schedules 1532, content 1538, or other determinants 1539 or linkages 1549. Alternatively or additionally, configuration module 1500 may likewise include one or more instances of modules 1551, 1552, 1553; data managers 1555; resources 1561, 1562; invocation modules 1564; evaluation logic 1565, 1570; content 1580 comprising one or more versions 1581, 1582; processors 1590; or image generators 1595 operable for generating one or more images 1591, 1592. Content 1538 may comprise, implicitly or explicitly, one or more instances of formats 1534 or other portions 1536 or sizes 1535 or other aspects. Linkage 1549 may refer to or otherwise comprise one or more instances of values 1542, conditions 1544, destinations 1546, or content 1548. Evaluation logic 1570 may comprise one or more instances of images 1573 or other expressions 1574, 1576, 1577.

Figure 16:
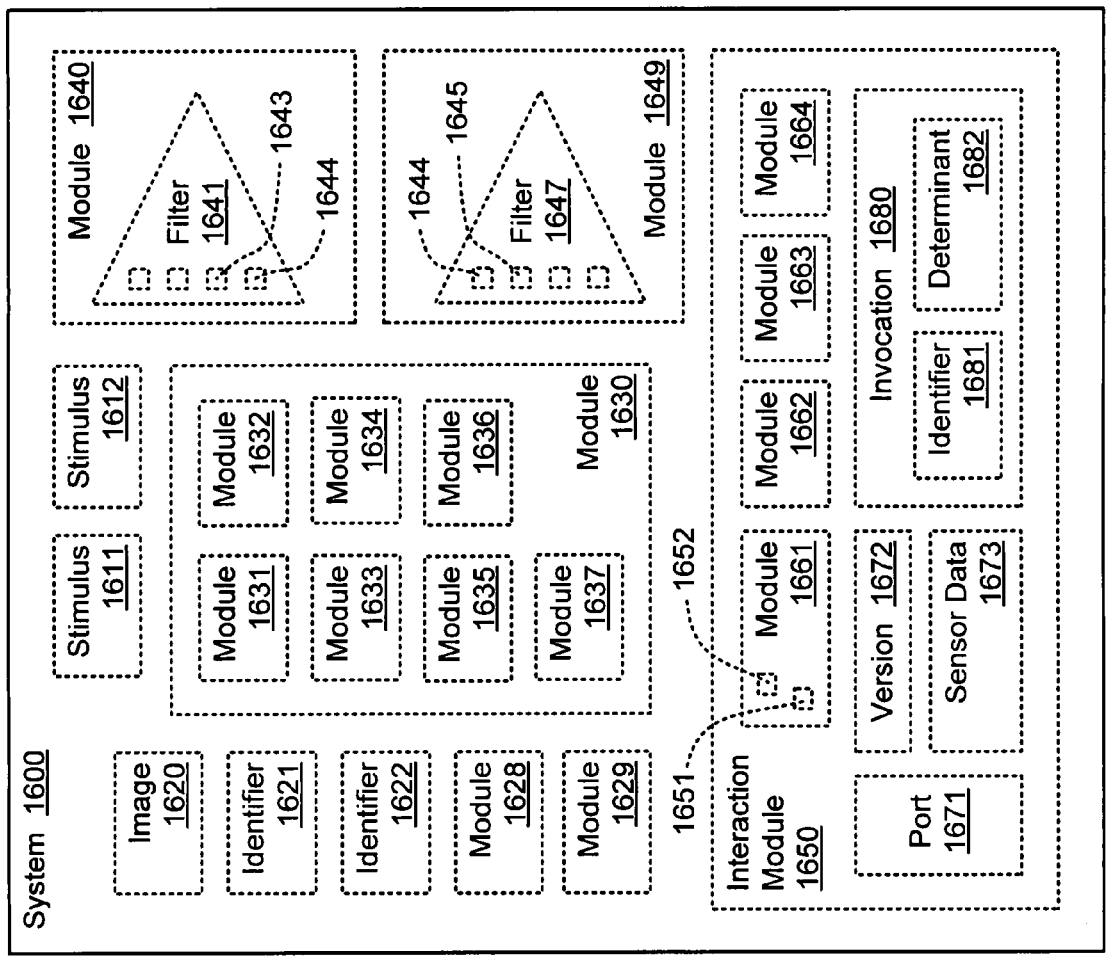

With reference now to FIG. 16, shown is another example of a system that may serve as a context for introducing one or more processes and/or devices described herein. System 1600 may include one or more instances of stimuli 1611, 1612; images 1620; identifiers 1621, 1622; or nested or other modules 1628, 1629, 1630, 1631, 1632, 1633, 1634, 1635, 1636, 1637, 1640, 1649 such as interaction module 1650. Modules 1640, 1649 may each comprise one or more instances of filters 1641, 1647 configured for applying one or more criteria 1643, 1644, 1645. Interaction module 1650 may comprise one or more instances of modules 1661, 1662, 1663, 1664 (each with one or more indications 1651, 1652, for example); ports 1671; versions 1672; sensor data 1673; or invocations 1680 (optionally comprising one or more identifiers 1681 or determinants 1682).

Figure 17:
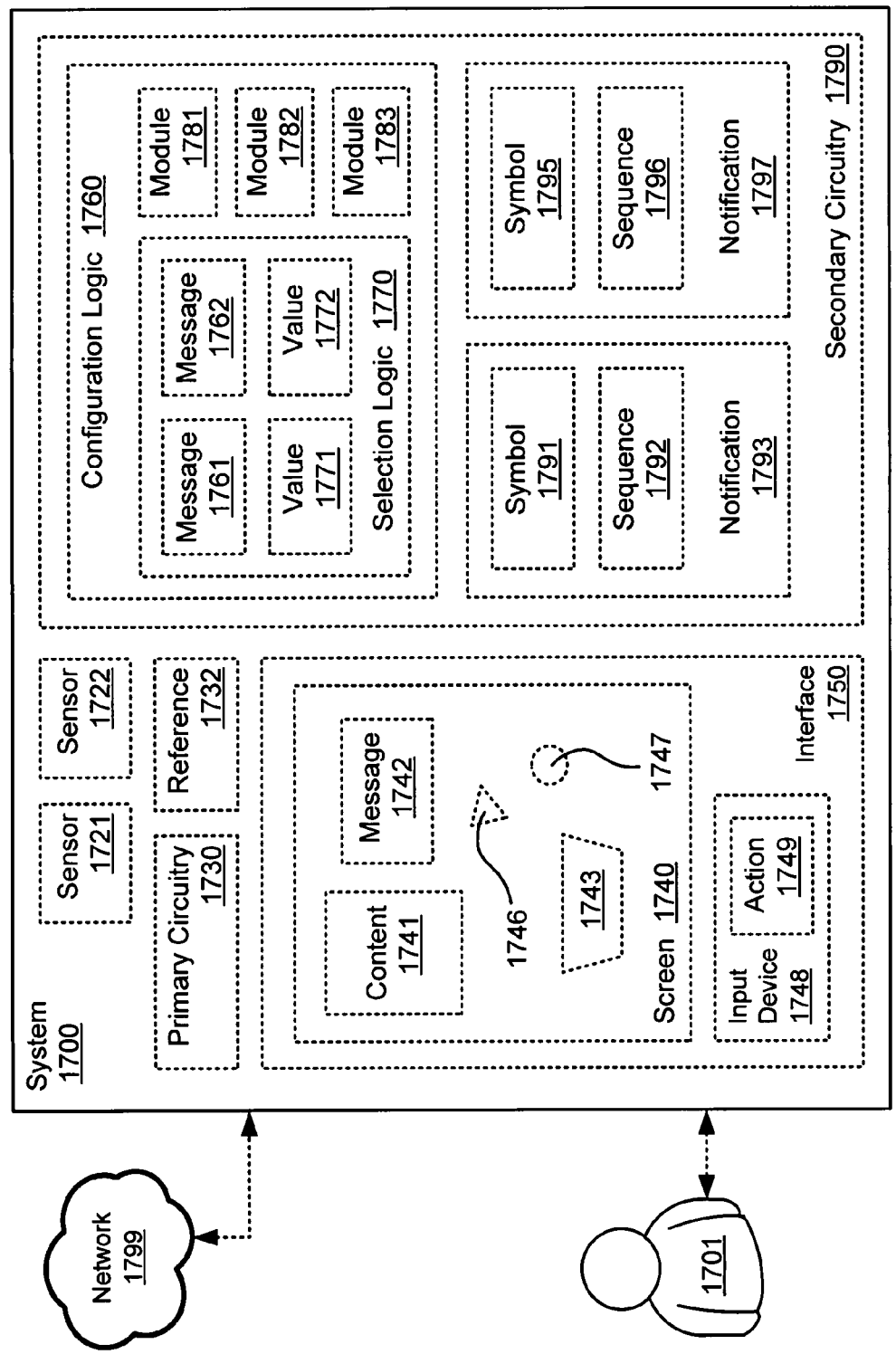

With reference now to FIG. 17, shown is another example of a system that may serve as a context for introducing one or more processes and/or devices described herein. System 1700 may include one or more instances of sensors 1721, 1722; primary circuitry 1730; references 1732; interfaces 1750; or secondary circuitry 1790; each of which may be operable for interacting with one or more users 1701 or networks 1799 as shown. Interface 1750 may include one or more instances of screens 1740, which may be operable for presenting or otherwise acting on one or more instances of messages 1742 or other content 1741, 1743 and/or on pointer 1746 or other control 1747. Alternatively or additionally, interface 1750 may include one or more input devices 1748 operable for detecting or otherwise indicating one or more user actions 1749. Secondary circuitry 1790 may comprise one or more instances of configuration logic 1760 such as selection logic 1770 or other modules 1781, 1782, 1783. Selection logic 1770 may comprise one or more instances of messages 1761, 1762 or other values 1771, 1772. Secondary circuitry may further comprise one or more notifications 1793, 1797 respectively comprising one or more symbols 1791, 1795 and/or sequences 1792, 1796.

Figure 18:
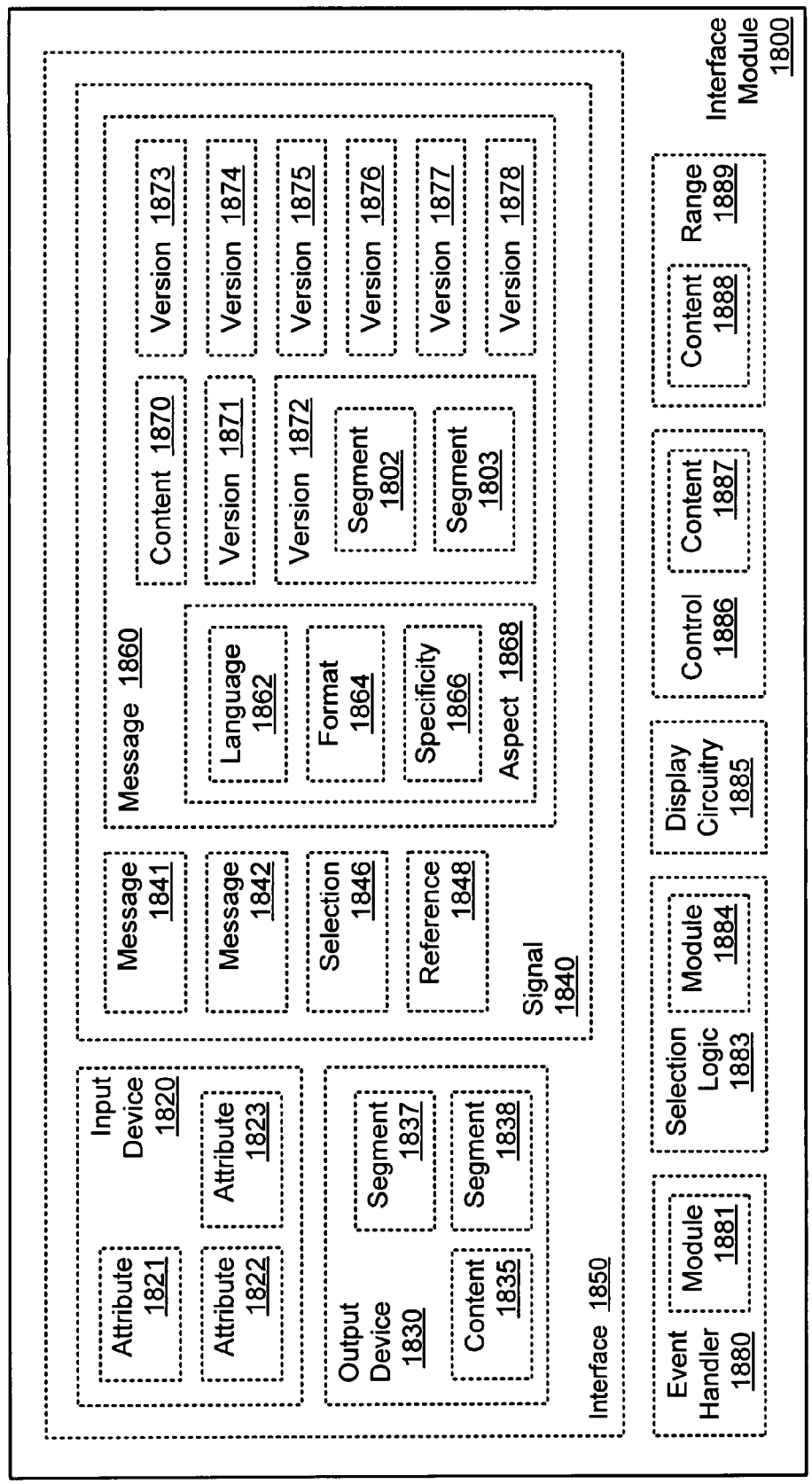

With reference now to FIG. 18, shown is another example of a system that may serve as a context for introducing one or more processes and/or devices described herein. Interface module 1800 may include one or more instances of interfaces 1850, modules 1881 of event handlers 1880, modules 1884 of selection logic 1883, display circuitry 1885, or controls 1886 or ranges 1889 that may include content 1887, 1888. Interface 1850 may include one or more instances of input devices 1820, output devices 1830, or signals 1840. Input device 1820 may detect or otherwise indicate one or more instances of attributes 1821, 1822, 1823. Output device 1830 may present or otherwise indicate one or more segments 1837, 1838 or other content 1835. Signal 1840 may comprise one or more instances of selections 1846, references 1848, or messages 1841, 1842, 1860. Message 1860 may, for example, comprise one or more instances of languages 1862, formats 1864, specificities 1866, or other aspects 1868; content 1870; or various versions 1871, 1872, 1873, 1874, 1875, 1876, 1877, 1878 each including one or more segments 1802, 1803.

Figure 19:
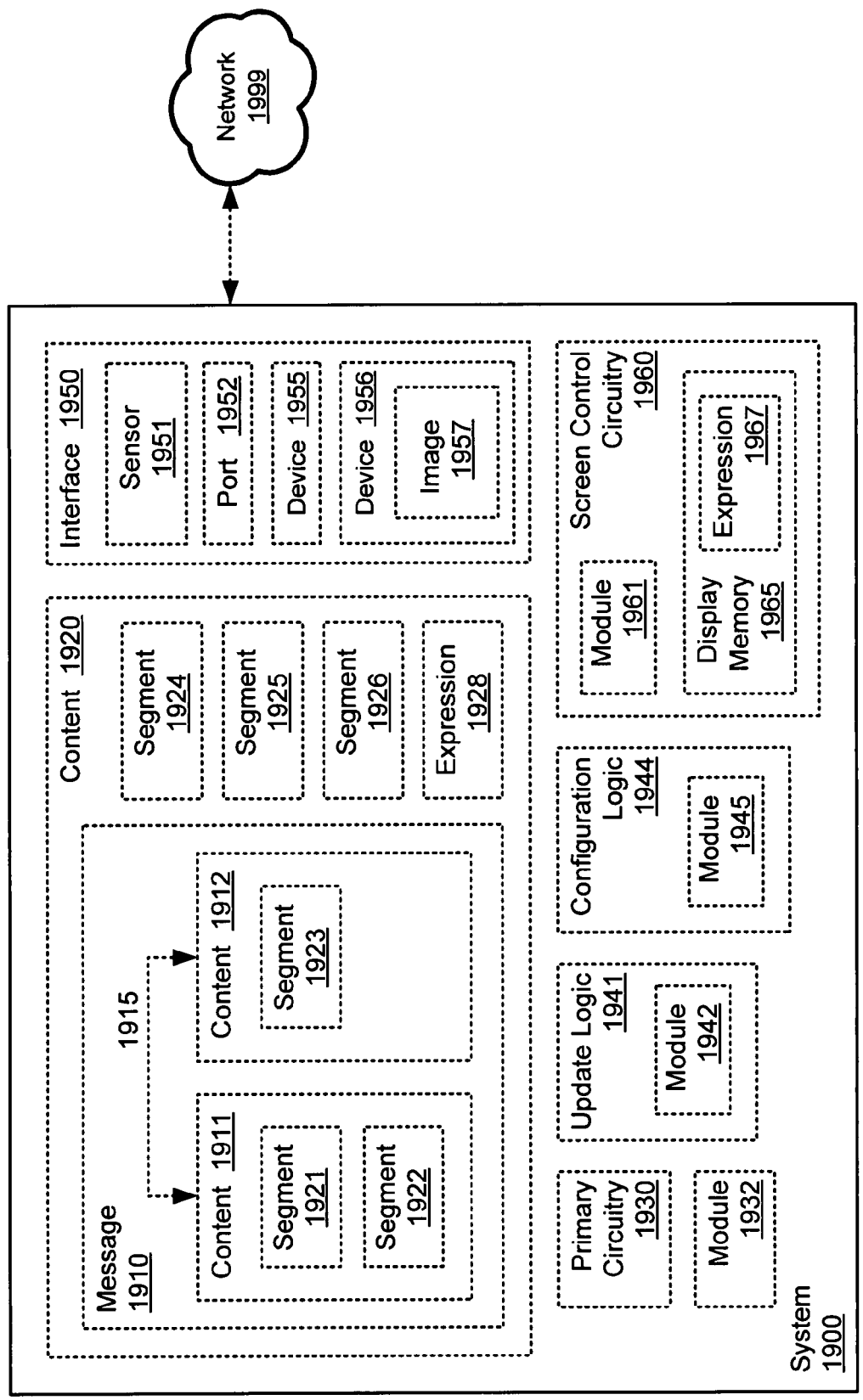

With reference now to FIG. 19, shown is another example of a system that may serve as a context for introducing one or more processes and/or devices described herein. System 1900 may be operable for interaction with network 1999, and may include one or more instances of content 1920, interfaces 1950, primary circuitry 1930, module 1932, one or more modules 1942 of update logic 1941, one or more modules 1945 of configuration logic 1944, or screen control circuitry 1960. Content 1920 may, for example, include one or more instances of messages 1910, segments 1924, 1925, 1926, or other expressions 1928. Message 1910 may comprise instances of content 1911, 1912 having a relationship 1915. As shown, for example, content 1911 may comprise segments 1921, 1922 and content 1912 may comprise 1923. Interface 1950 may comprise one or more instances of sensors 1951, ports 1952, or images 1957 or other data that may be indicated or otherwise handled by one or more interface devices 1955, 1956. Screen control circuitry 1960 may comprise one or more display memory 1965 operable for holding expression 1967 during presentation, or other modules 1961.

Figure 20:
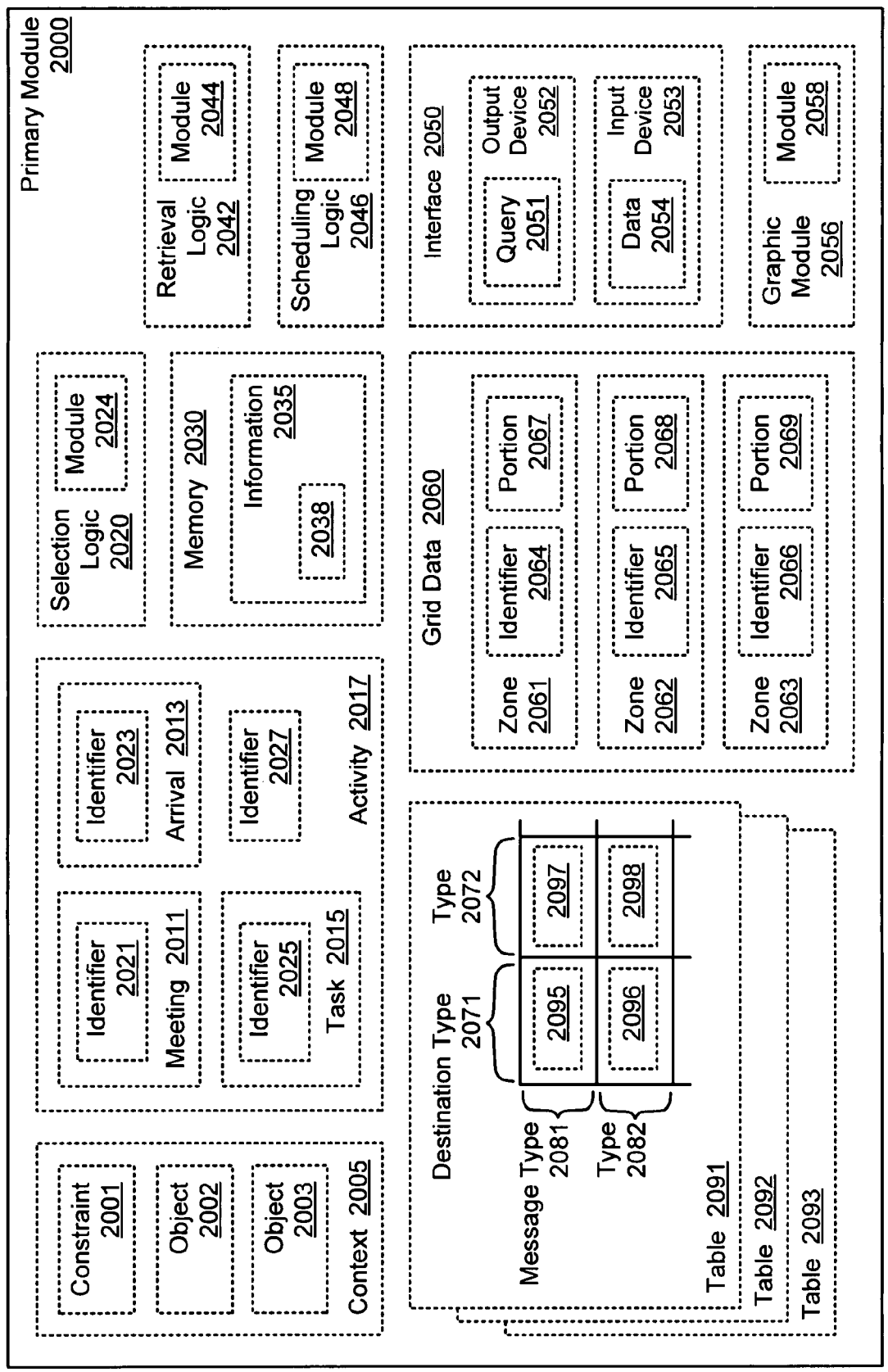

With reference now to FIG. 20, shown is another example of a system that may serve as a context for introducing one or more processes and/or devices described herein. Primary module 2000 may include one or more instances of constraints 2001 or other objects 2002, 2003 of respective contexts 2005 relating to one or more activities 2017. Primary module 2000 may further include one or more instances of modules 2024 of selection logic 2020, memories 2030, modules 2044 of retrieval logic 2042, modules 2048 of scheduling logic 2046, tables 2091, 2092, 2093 or similar grid data 2060, interfaces 2050, or other modules 2058 (of graphic modules 2056, for example). Memory 2030 may contain one or more instances of identifiers 2038 or other working data or other information 2035 for modules as described herein. Table 2091 may comprise one or more instances of segments 2095, 2096, 2097, 2098 each relating with one or more respective destination types 2071, 2072 and message types 2081, 2082 as shown. Grid data 2060 may comprise one or more instances of identifiers 2064, 2065, 2066 or other portions 2067, 2068, 2069 in each of respective zones 2061, 2062, 2063. Interface 2050 comprises one or more instances of output devices 2052 (operable for handling one or more queries 2051, for example) or input devices 2053 (operable for handling data 2054, for example).

Figure 21:
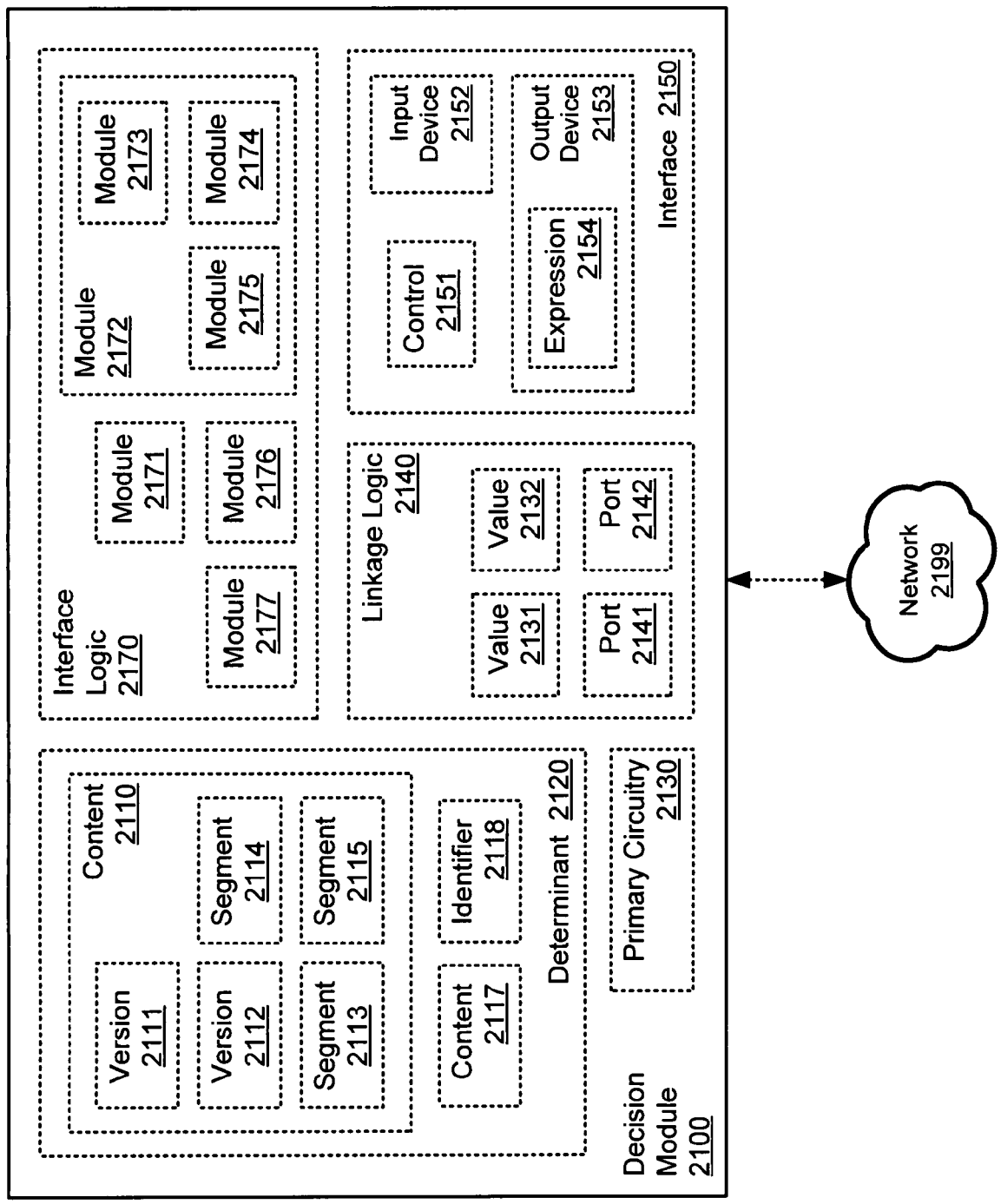

With reference now to FIG. 21, shown is another example of a system that may serve as a context for introducing one or more processes and/or devices described herein. Decision module 2100 may include one or more instances of content 2110, 2117, identifiers 2118, or other determinants 2120; primary circuitry 2130; linkage logic 2140; interface 2150; or interface logic 2170. Content 2110 may comprise one or more instances of versions 2111, 2112 and/or respective segments 2113, 2114, 2115. Linkage logic 2140 may incorporate or otherwise relate two or more values 2131, 2132, optionally via one or more ports 2141, 2142. Interface 2150 may comprise one or more instances of controls 2151, input devices 2152, or output devices 2153 operable for presenting expressions 2154 as described herein. Interface logic 2170 may likewise comprise one or more nested or other modules 2171, 2172, 2173, 2174, 2175, 2176, 2177 as described herein.

Figure 22:
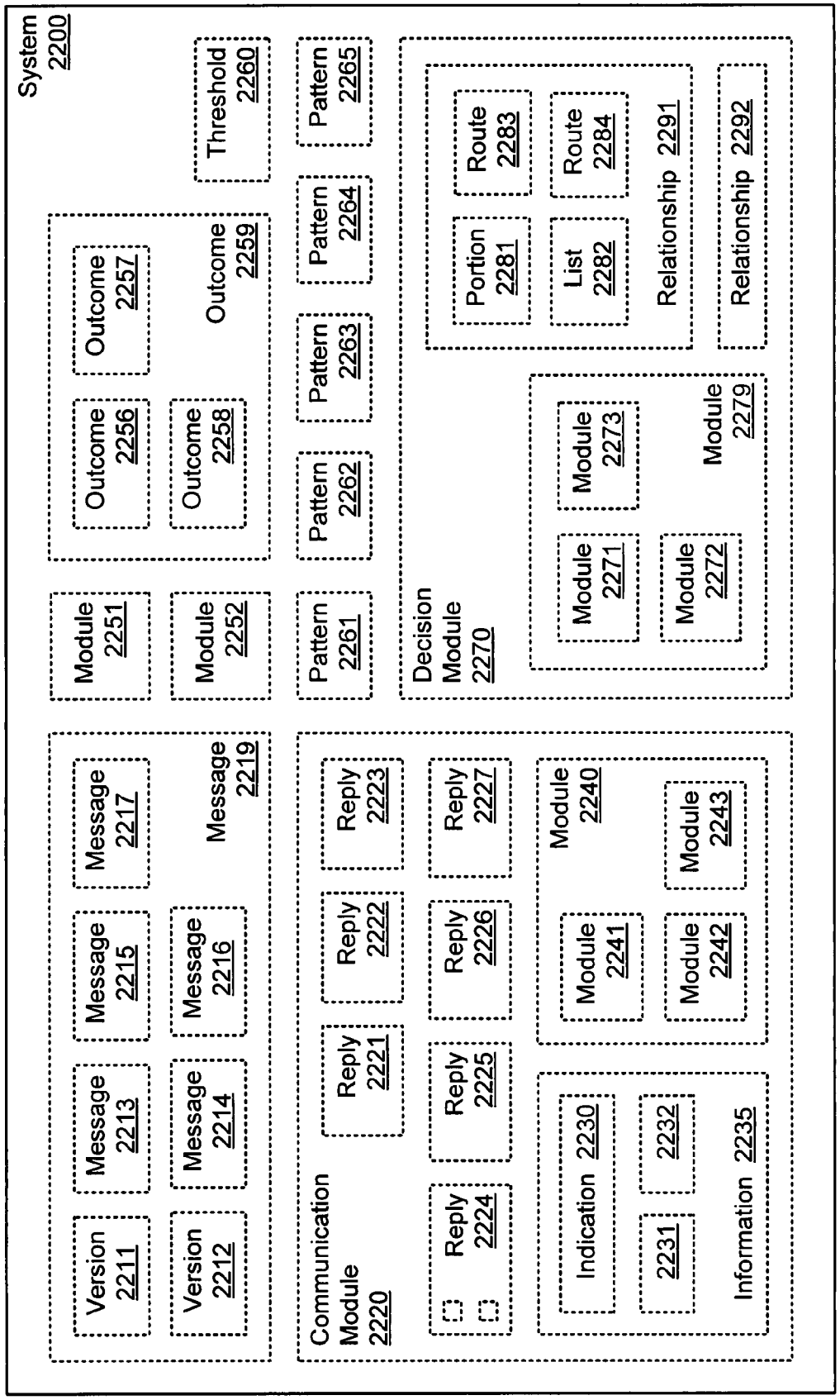

With reference now to FIG. 22, shown is another example of a system that may serve as a context for introducing one or more processes and/or devices described herein. System 2200 may comprise one or more instances of (respective versions 2211, 2212 or other) messages 2213, 2214, 2215, 2216, 2217, 2219. System 2200 may further comprise one or more instances of outcomes 2256, 2257, 2258, 2259; thresholds 2260; patterns 2261, 2262, 2263, 2264, 2265; or communication modules 2220, decision modules 2270, or other modules 2251, 2252. Communication module 2220 may comprise one or more replies 2221, 2222, 2223, 2224, 2225, 2226, 2227 or other information 2235, as well as one or more modules 2240, 2241, 2242, 2243. Information 2235 may, for example, comprise one or more instances of pattern instances 2231, 2232 or other indications 2230. Decision module 2270 may comprise one or more instances of nested or other modules 2271, 2272, 2273, 2279 or relationships 2291, 2292, which may include one or more distribution lists 2282, routes 2283, 2284, or other portions 2281 as described herein.

Figure 23:
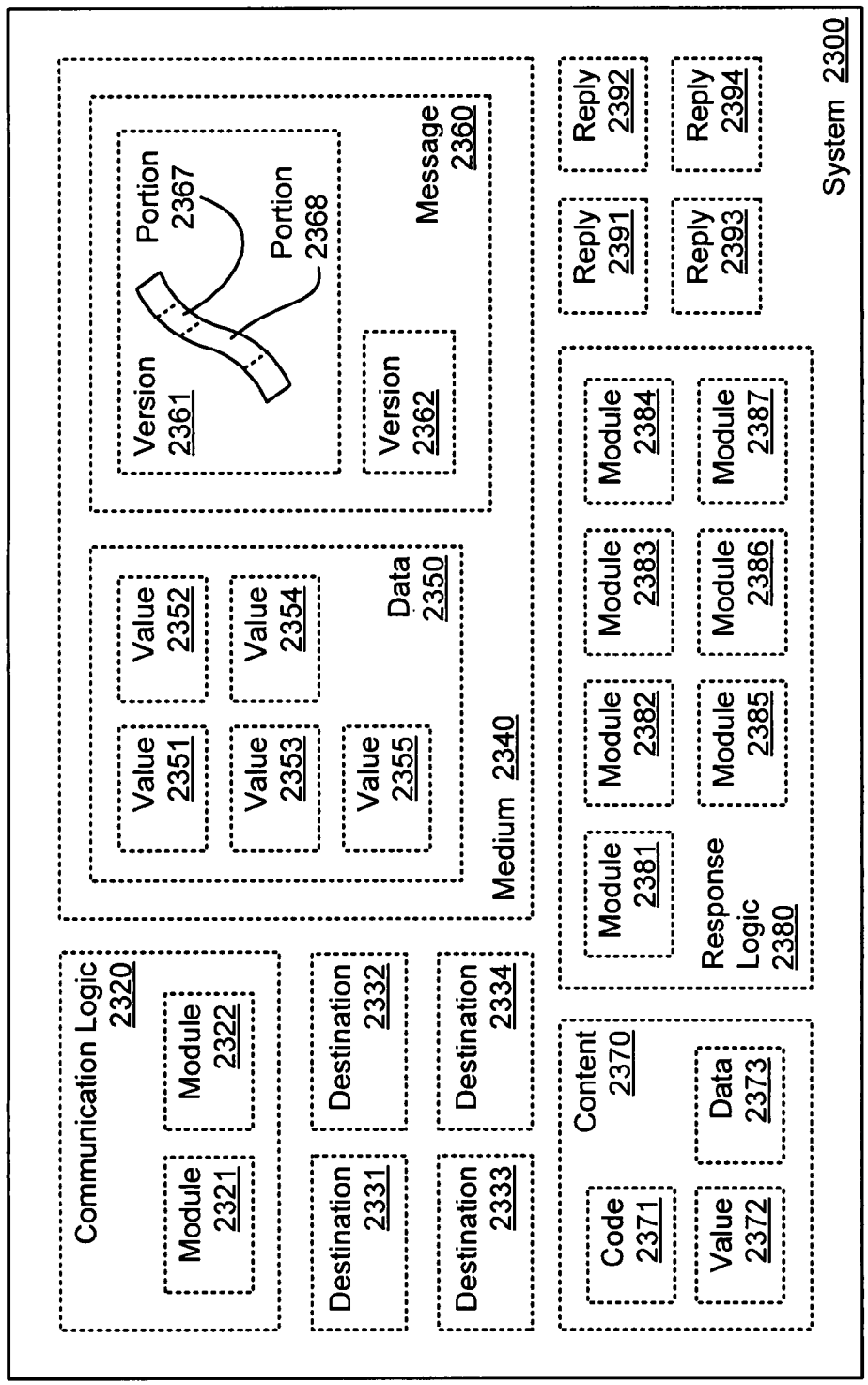

With reference now to FIG. 23, shown is another example of a system that may serve as a context for introducing one or more processes and/or devices described herein. System 2300 may include one or more instances of module 2321, 2322 of communication logic 2320; destinations 2331, 2332, 2333, 2334; media 2340; code 2371, values 2372, data 2373 or other content 2370; modules 2381, 2382, 2383, 2384, 2385, 2386, 2387 of response logic 2380; or replies 2391, 2392, 2393, 2394. Medium 2340, for example, may comprise one or more instances of values 2351, 2352, 2353, 2354, 2355 or other data 2350 as well as respective portions 2367, 2368 (e.g. of one or more versions 2361, 2362) of message 2360.

Some systems above illustrate elements provided without explicit operational illustrations, particularly with regard to FIGS. 4-23. For further information about such elements and related technology, the following patent applications filed on even date herewith are incorporated by reference to the extent not inconsistent herewith: Ser. No. 11/899,013 ("Using Destination-Dependent Criteria to Guide Data Transmission Decisions"); Ser. No. 11/899/016 ("Using Party Classifiability to Inform Message Versioning"); Ser. No. 11/899/014 ("Message-Reply-Dependent Update Decisions"); and Ser. No. 11/899/015 ("Layering Prospective Activity Information").

Figure 24:
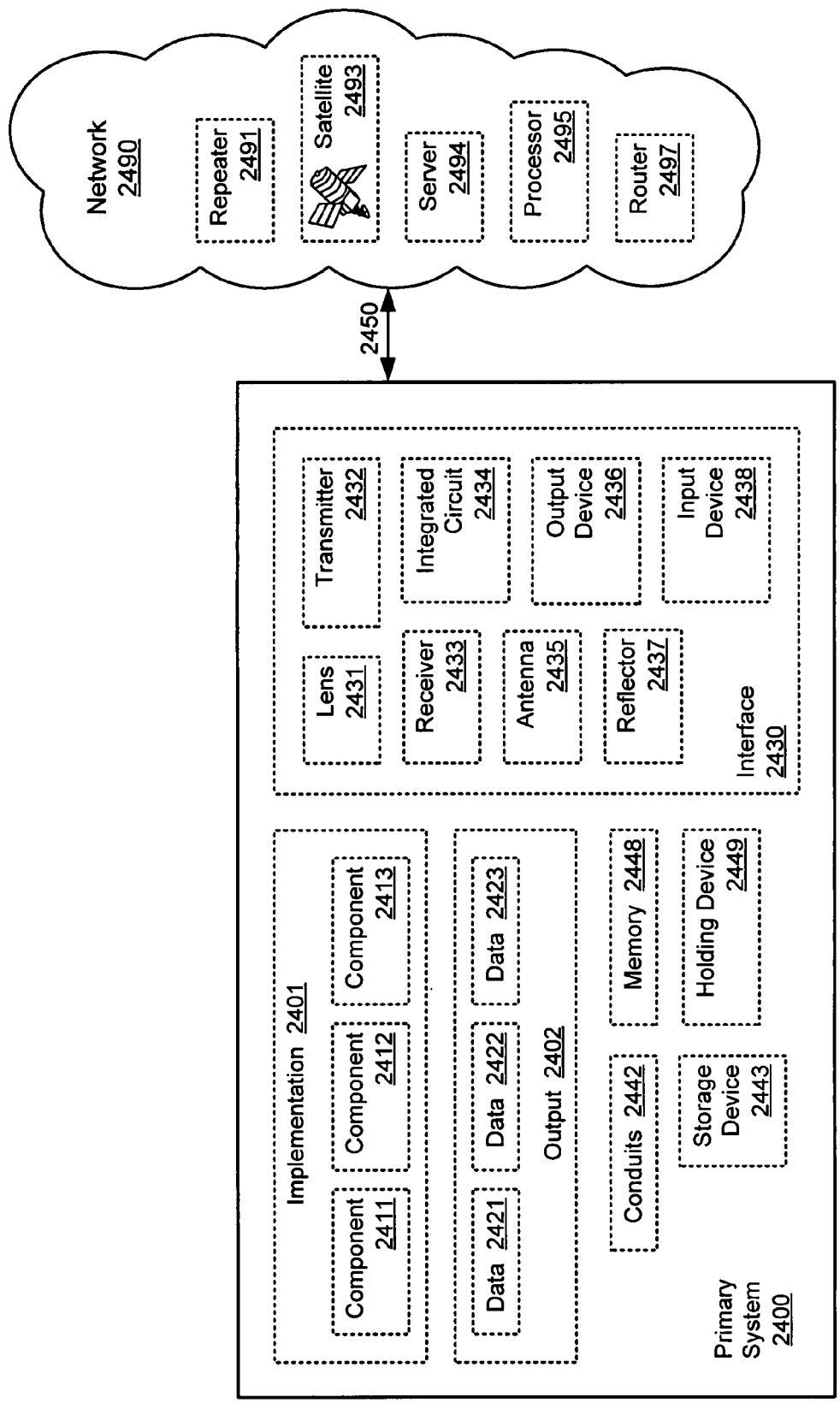

With reference now to FIG. 24, shown is an example of a system that may serve as a context for introducing one or more processes, systems or other articles described herein. Primary system 2400 may include one or more instances of implementations 2401 or outputs 2402 that may be held or transmitted by interfaces 2430, conduits 2442, storage devices 2443, memories 2448, or other holding devices 2449 or the like. In various embodiments as described herein, for example, one or more instances of implementation components 2411, 2412, 2413 or implementation output data 2421, 2422, 2423 may each be expressed in any aspect or combination of software, firmware, or hardware as signals, data, designs, logic, instructions, or the like. The interface(s) 2430 may include one or more instances of lenses 2431, transmitters 2432, receivers 2433, integrated circuits 2434, antennas 2435, output devices 2436, reflectors 2437, input devices 2438, or the like for handling data or communicating with local users or with network 2490 via linkage 2450, for example. Several variants of FIG. 24 are described below with reference to one or more instances of repeaters 2491, communication satellites 2493, servers 2494, processors 2495, routers 2497, or other elements of network 2490.

Those skilled in the art will recognize that some list items may also function as other list items. In the above-listed types of media, for example, some instances of interface(s) 2430 may include conduits 2442, or may also function as storage devices that are also holding devices 2449. One or more transmitters 2432 may likewise include input devices or bidirectional user interfaces, in many implementations of interface(s) 2430. Each such listed term should not be narrowed by any implication from other terms in the same list but should instead be understood in its broadest reasonable interpretation as understood by those skilled in the art.

Several variants described herein refer to device-detectable "implementations" such as one or more instances of computer-readable code, transistor or latch connectivity layouts or other geometric expressions of logical elements, firmware or software expressions of transfer functions implementing computational specifications, digital expressions of truth tables, or the like. Such instances can, in some implementations, include source code or other human-readable portions. Alternatively or additionally, functions of implementations described herein may constitute one or more device-detectable outputs such as decisions, manifestations, side effects, results, coding or other expressions, displayable images, data files, data associations, statistical correlations, streaming signals, intensity levels, frequencies or other measurable attributes, packets or other encoded expressions, or the like from invoking or monitoring the implementation as described herein.

Referring again to FIG. 2, flow 200 may be performed by one or more instances of server 2494 remote from primary system 2400, for example, but operable to cause output device(s) 2436 to receive and present results via linkage 2450. Alternatively or additionally, device-detectable data 2422 may be borne by one or more instances of signal-bearing conduits 2442, holding devices 2449, integrated circuits 2434, or the like as described herein. Such data may optionally be configured for transmission by a semiconductor chip or other embodiment of integrated circuit 2434 that contains or is otherwise operatively coupled with antenna 2435 (in a radio-frequency identification tag, for example).

In some variants, some instances of flow 200 may be implemented entirely within primary system 2400, optionally configured as a stand-alone system. Operation 250 may be implemented by configuring component 2411 as logic for obtaining one or more potential recipient identifiers and one or more user indications of first content generation guidance, for example. This may be accomplished by including special-purpose instruction sequences or special-purpose-circuit designs for this function, for example, in optical or other known circuit fabrication operations, in programming by various known voltage modulation techniques, or otherwise as described herein or known by those skilled in the art. Output data 2421 from such a component in primary system 2400 or network 2490 may be recorded by writing to or otherwise configuring available portions of storage device(s) 2443.

Alternatively or additionally, such specific output data may be transmitted by configuring transistors, relays, or other drivers or conduits 2442 of primary system 2400 to transfer it to component 2412, for example. Component 2412 may perform operation 280 via implementation as logic for presenting second content generation guidance partly based on the one or more potential recipient identifiers and partly based on the one or more user indications of the first content generation guidance, for example. Implementation output data 2422 from such a component in primary system 2400 or network 2490 may be recorded into available portions of storage device(s) 2443 or sent to component 2413, for example. Output 2402 from flow 200 may likewise include other data 2423 as described herein. Each portion of implementation 2401 may likewise include one or more instances of software, hardware, or the like implementing logic that may be expressed in several respective forms as described herein or otherwise understood by those skilled in the art.

In some embodiments, output device 2436 may indicate an occurrence of flow 200 concisely as a decision, an evaluation, an effect, a hypothesis, a probability, a notification, or some other useful technical result. For example, such "indicating" may comprise such modes as showing, signifying, acknowledging, updating, explaining, associating, or the like in relation to any past or ongoing performance of such actions upon the common item(s) as recited. Such indicating may also provide one or more specifics about the occurrence: the parties or device(s) involved, a description of the method or performance modes used, any sequencing or other temporal aspects involved, indications of resources used, location(s) of the occurrence, implementation version indications or other update-indicative information, or any other such contextual information that may be worthwhile to provide at potential output destinations.

Concise indication may occur, for example, in a context in which at least some items of data 2421-2423 do not matter, or in which a recipient may understand or access portions of data 2421-2423 without receiving a preemptive explanation of how it was obtained. By distilling at least some output 2402 at an "upstream" stage (which may comprise integrated circuit 2434, for example, in some arrangements), downstream-stage media (such as other elements of network 2490, for example) may indicate occurrences of various methods described herein more effectively. Variants of flow 200, for example, may be enhanced by distillations described herein, especially in bandwidth-limited transmissions, security-encoded messages, long-distance transmissions, complex images, or compositions of matter bearing other such expressions.

In some variants, a local implementation comprises a service operable for accessing a remote system running a remote implementation. In some embodiments, such "accessing" may include one or more instances of establishing or permitting an interaction between the server and a local embodiment such that the local embodiment causes or uses another implementation or output of one or more herein-described functions at the server. Functioning as a web browser, remote terminal session, or other remote activation or control device, for example, interface(s) 2430 may interact with one or more primary system users via input and output devices 2436, 2438 so as to manifest an implementation in primary system 2400 via an interaction with server 2494, for example, running a secondary implementation of flow 200. Such local implementations may comprise a visual display supporting a local internet service to the remote server, for example. Such a remote server may control or otherwise enable one or more instances of hardware or software operating the secondary implementation outside a system, network, or physical proximity of primary system 2400. For a building implementing primary system 2400, for example, "remote" devices may include those in other countries, in orbit, or in adjacent buildings. In some embodiments, "running an implementation" may include invoking one or more instances of software, hardware, firmware, or the like atypically constituted or adapted to facilitate methods or functions as described herein. For example, primary system 2400 running an implementation of flow 200 may be a remote activation of a special-purpose computer program resident on server 2494 via an internet browser session interaction through linkage 2450, mediated by input device 2438 and output device 2436.

In some variants, some or all of components 2411-2413 may be borne in various data-handling elements—e.g., in one or more instances of storage devices 2443, in memories 2448 or volatile media, passing through linkage 2450 with network 2490 or other conduits 2442, in one or more registers or data-holding devices 2449, or the like. For example, such processing or configuration can occur in response to user data or the like received at input device 2438 or may be presented at output device 2436. Instances of input devices 2438 may (optionally) include one or more instances of cameras or other optical devices, hand-held systems or other portable systems, keypads, sensors, or the like as described herein. Output device(s) 2436 may likewise include one or more instances of image projection modules, touch screens, wrist-wearable systems or the like adapted to be worn while in use, headphones and speakers, eyewear, liquid crystal displays (LCDs), actuators, lasers, organic or other light-emitting diodes, phosphorescent elements, portions of (hybrid) input devices 2438, or the like.

A device-detectable implementation of variants described herein with reference to flow 200 for example, may be divided into several components 2411-2413 carried by one or more instances of active modules such as signal repeaters 2491, communication satellites 2493, servers 2494, processors 2495, routers 2497, or the like. For example, in some embodiments, component 2412 may be borne by an "upstream" module (e.g., repeater 2491 or the like) while or after component 2411 is borne in a "downstream" module (e.g., another instance of repeater 2491, communication satellite 2493, server 2494, or the like). Such downstream modules may "accept" such bits or other portions of implementation 2401 sequentially, for example, such as by amplifying, relaying, storing, checking, or otherwise processing what was received actively. Sensors and other "upstream" modules may likewise "accept" raw data, such as by measuring physical phenomena or accessing one or more databases.

In some embodiments, a medium bearing data (or other such event) may be "caused" (directly or indirectly) by one or more instances of prior or contemporaneous measurements, decisions, transitions, circumstances, or other causal determinants. Any such event may likewise depend upon one or more other prior, contemporaneous, or potential determinants, in various implementations as taught herein. In other words, such events can occur "in response" to both preparatory (earlier) events and triggering (contemporaneous) events in some contexts. Output 2402 may result from more than one component of implementations 2401 or more than one operation of flow 200, for example.

In some embodiments, such integrated circuits 2434 may comprise transistors, capacitors, amplifiers, latches, converters, or the like on a common substrate of a semiconductor material, operable to perform computational tasks or other transformations. An integrated circuit may be application-specific ("ASIC") in that it is designed for a particular use rather than for general purpose use. An integrated circuit may likewise include one or more instances of memory circuits, processors, field-programmable gate arrays (FPGA's), antennas, or other components, and may be referred to as a system-on-a-chip ("SoC").

In some embodiments, one or more instances of integrated circuits or other processors may be configured to perform auditory pattern recognition. In FIG. 24, for example, instances of the one or more input devices 2438 may include a microphone or the like operable to provide auditory samples in data 2421-2423. Some form or portion of such output may be provided remotely, for example, to one or more instances of neural networks or other configurations of remote processors 2495 operable to perform automatic or supervised speech recognition, selective auditory data retention or transmission, or other auditory pattern recognition, upon the samples. Alternatively or additionally such sound-related data may include annotative information relating thereto such as a capture time or other temporal indications, capture location or other source information, language or other content indications, decibels or other measured quantities, pointers to related data items or other associative indications, or other data aggregations or distillations as described herein.

In some embodiments, one or more instances of integrated circuits or other processors may be configured for optical image pattern recognition. In FIG. 24, for example, instances of lenses 2431 or other input devices 2438 may include optical sensors or the like operable to provide one or more of geometric, hue, or optical intensity information in data 2421-2423. Some form or portion of such output may be provided locally, for example, to one or more instances of optical character recognition software, pattern recognition processing resources, or other configurations of integrated circuits 2434 operable to perform automatic or supervised image recognition, selective optical data retention or transmission, or the like. Alternatively or additionally such image-related data may include annotative information relating thereto such as a capture time or other temporal indications, capture location or other source information, language or other content indications, pointers to related data items or other associative indications, or other data aggregations or distillations as described herein.

In some embodiments, one or more instances of integrated circuits or other processors may be configured to perform linguistic pattern recognition. In FIG. 24, for example, instances of input devices 2438 may include keys, pointing devices, microphones, sensors, reference data, or the like operable to provide spoken, written, or other symbolic expressions in data 2421-2423. Some form or portion of such output may be provided locally, for example, to one or more instances of translation utilities, compilers, or other configurations of integrated circuits 2434 operable to perform automatic or supervised programming or other language recognition, selective linguistic data retention or transmission, or the like. Alternatively or additionally such language-related data may include annotative information relating thereto such as a capture time or other temporal indications, capture location or other source information, language or other content indications, pointers to related data items or other associative indications, or other data classifications, aggregations, or distillations as described herein.

In some embodiments, one or more antennas 2435 or receivers 2433 may include a device that is the receiving end of a communication channel as described herein. For example, such a receiver may gather a signal from a dedicated conduit or from the environment for subsequent processing and/or retransmission. As a further example, such antennas or other receivers may include one or more instances of wireless antennas, radio antennas, satellite antennas, broadband receivers, digital subscriber line (DSL) receivers, modem receivers, transceivers, or configurations of two or more such devices for data reception as described herein or otherwise known.

In one variant, two or more respective portions of output data 2421-2423 may be sent from server 2494 through respective channels at various times, one portion passing through repeater 2491 and another through router 2497. Such channels may each bear a respective portion of a data aggregation or extraction, a publication, a comparative analysis or decision, a record selection, digital subscriber content, statistics or other research information, a resource status or potential allocation, an evaluation, an opportunity indication, a test or computational result, or some other output 2402 of possible interest. Such distributed media may be implemented as an expedient or efficient mode of bearing such portions of output data to a common destination such as interface 2430 or holding device 2449. Alternatively or additionally, some such data may be transported by moving a medium (carried on storage device 2443, for example) so that only a small portion (a purchase or other access authorization, for example, or a contingent or supplemental module) is transferred via linkage 2450.

In some embodiments, one or more instances of signal repeaters 2491 may include a device or functional implementation that receives a signal and transmits some or all of the signal with one or more of an altered strength or frequency, or with other modulation (e.g., an optical-electrical-optical amplification device, a radio signal amplifier or format converter, a wireless signal amplifier, or the like). A repeater may convert analog to digital signals or digital to analog signals, for example, or perform no conversion. Alternatively or additionally, a repeater may reshape, retime or otherwise reorder an output for transmission. A repeater may likewise introduce a frequency offset to an output signal such that the received and transmitted frequencies are different. A repeater also may include one or more instances of a relay, a translator, a transponder, a transceiver, an active hub, a booster, a noise-attenuating filter, or the like.

In some embodiments, such communication satellite(s) 2493 may be configured to facilitate telecommunications while in a geosynchronous orbit, a Molniya orbit, a low earth orbit, or the like. Alternatively or additionally, a communication satellite may receive or transmit, for example, telephony signals, television signals, radio signals, broadband telecommunications signals, or the like.

Figure 26:
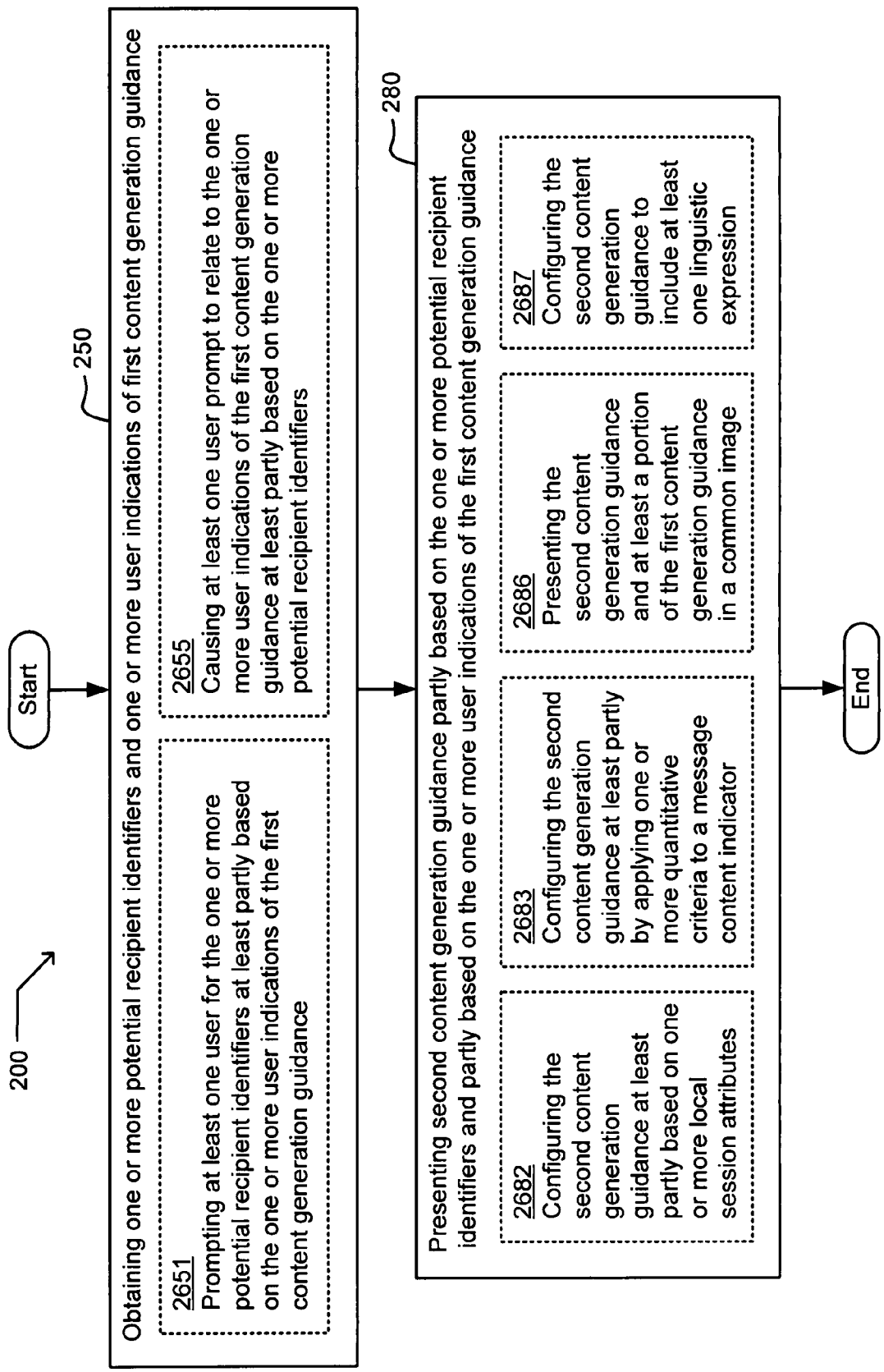
FIGS. 26-27 depict variants of the flow of FIG. 2.
Figure 27:
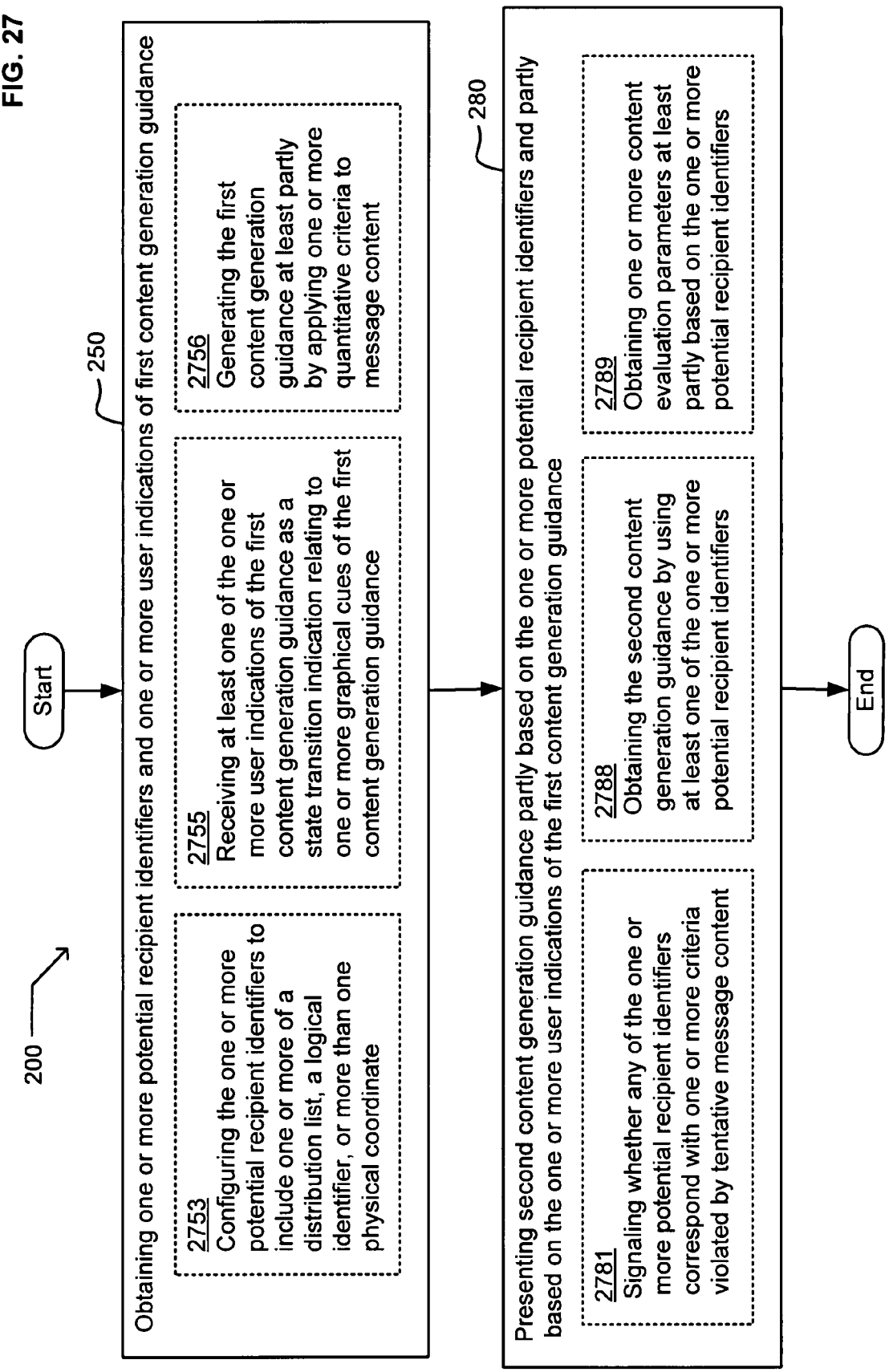

In some variants, processor 2495 or any components 2411-2413 of implementation 2401 may (optionally) be configured to perform flow variants as described herein with reference to FIGS. 26-27. An occurrence of such a variant may be expressed as a computation, a transition, or as one or more other items of data 2421-2423 described herein. Such output 2402 may be generated, for example, by depicted components of primary system 2400 or network 2490 including one or more features as described herein.

Figure 25:
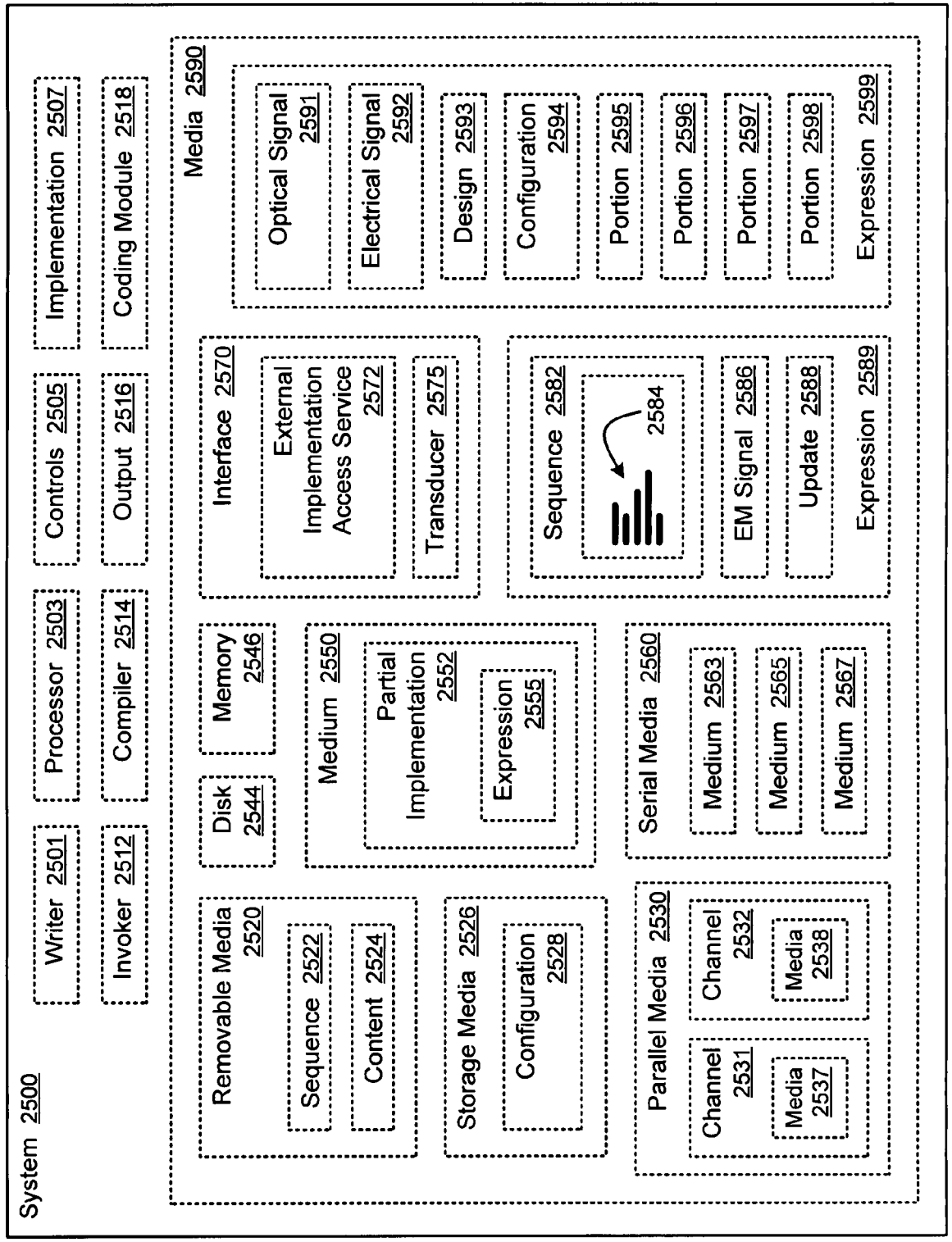

With reference now to FIG. 25, shown is an example of another system that may serve as a context for introducing one or more processes, systems or other articles described herein. As shown system 2500 comprises one or more instances of writers 2501, processors 2503, controls 2505, software or other implementations 2507, invokers 2512, compilers 2514, outputs 2516, coding modules 2518, or the like with one or more media 2590 bearing expressions or outputs thereof. In some embodiments, such media may include distributed media bearing a divided or otherwise distributed implementation or output. For example, in some embodiments, such media may include two or more physically distinct solid-state memories, two or more transmission media, a combination of such transmission media with one or more data-holding media configured as a data source or destination, or the like.

In some embodiments, transmission media may be "configured" to bear an output or implementation (a) by causing a channel in a medium to convey a portion thereof or (b) by constituting, adapting, addressing, or otherwise linking to such media in some other mode that depends upon one or more atypical traits of the partial or whole output or implementation. Data-holding elements of media may likewise be "configured" to bear an output or implementation portion (a) by holding the portion in a storage or memory location or (b) by constituting, adapting, addressing, or otherwise linking to such media in some other mode that depends upon one or more atypical traits of the partial or whole output or implementation. Such atypical traits may include a name, address, portion identifier, functional description, or the like sufficient to distinguish the output, implementation, or portion from a generic object.

In some embodiments described herein, "logic" and similar implementations may include software or other control structures operable to guide device operation. Electronic circuitry, for example, may manifest one or more paths of electrical current constructed and arranged to implement various logic functions as described herein. In some embodiments, one or more media are "configured to bear" a device-detectable implementation if such media hold or transmit a special-purpose device instruction set operable to perform a novel method as described herein. Alternatively or additionally, in some variants, an implementation may include special-purpose hardware or firmware components or general-purpose components executing or otherwise invoking special-purpose components. Specifications or other implementations may be transmitted by one or more instances of transmission media as described herein, optionally by packet transmission or otherwise by passing through distributed media at various times.

In some embodiments, one or more of the coding modules 2518 may be configured with circuitry for applying, imposing, or otherwise using a syntactic or other encoding constraint in forming, extracting, or otherwise handling respective portions of the device-detectable implementation or output. In encoding a software module or other message content, for example, compiler 2514 or coding module 2518 may implement one or more such constraints pursuant to public key or other encryption, applying error correction modes, certifying or otherwise annotating the message content, or implementing other security practices described herein or known by those skilled in the art. Alternatively or additionally, another instance of coding module 2518 may be configured to receive data (via receiver 2433, e.g.) and decode or otherwise distill the received data using one or more such encoding constraints. Compiler 2514 may, in some variants, convert one or more of components 2411-2413 from a corresponding source code form before the component(s) are transmitted across linkage 2450.

System 2500 may be implemented, for example, as one or more instances of stand-alone workstations, servers, vehicles, portable devices, removable media 2520, as components of primary system 2400 or network 2490 (of FIG. 24), or the like. Alternatively or additionally, media 2590 may include one or more instances of signal repeaters 2491, communication satellites 2493, servers 2494, processors 2495, routers 2497, portions of primary system 2400 as shown, or the like.

Media 2590 may include one or more instances of removable media 2520, tapes or other storage media 2526; parallel (transmission) media 2530; disks 2544; memories 2546; other data-handling media 2550; serial media 2560; interfaces 2570; or expressions 2589, 2599. Removable media 2520 may bear one or more device-detectable instances of instruction sequences 2522 or other implementations of flow 200, for example. Alternatively or additionally, in some embodiments, removable media 2520 may bear alphanumeric data, audio data, image data, structure-descriptive values, or other content 2524 in a context that indicates an occurrence of one or more flows 200. In some circumstances, transmission media may bear respective portions of implementations as described herein serially or otherwise non-simultaneously. In some variants in which two portions 2597, 2598 constitute a partial or complete software implementation or product of a novel method described herein, portion 2597 may follow portion 2598 successively through serial media 2563, 2565, 2567 (with transmission of portion 2597 partly overlapping in time with transmission of portion 2598 passing through medium 2563, for example). As shown, parallel channels 2531, 2532 are respectively implemented at least in media 2537, 2538 of a bus or otherwise effectively in isolation from one another. In some embodiments, a bus may be a system of two or more signal paths—not unified by a nominally ideal conduction path between them—configured to transfer data between or among internal or external computer components. For example, one data channel may include a power line (e.g., as medium 2565) operable for transmitting content of the device-detectable implementation as described herein between two taps or other terminals (e.g., as media 2563, 2567 comprising a source and destination). In another such configuration, one or more media 2537 of channel 2531 may bear portion 2597 before, while or after one or more other media 2538 of parallel channel 2532 bear portion 2598. In some embodiments, such a process can occur "while" another process occurs if they coincide or otherwise overlap in time substantially (by several clock cycles, for example). In some embodiments, such a process can occur "after" an event if any instance of the process begins after any instance of the event concludes, irrespective of other instances overlapping or the like.

In a variant in which a channel through medium 2550 bears an expression 2555 partially implementing an operational flow described herein, the remainder of the implementation may be borne (earlier or later, in some instances) by the same medium 2550 or by one or more other portions of media 2590 as shown. In some embodiments, moreover, one or more controls 2505 may configure at least some media 2590 by triggering transmissions as described above or transmissions of one or more outputs 2516 thereof.

In some embodiments, the one or more "physical media" may include one or more instances of conduits, layers, networks, static storage compositions, or other homogenous or polymorphic structures or compositions suitable for bearing signals. In some embodiments, such a "communication channel" in physical media may include a signal path between two transceivers or the like. A "remainder" of the media may include other signal paths intersecting the communication channel or other media as described herein. In some variants, another exemplary system comprises one or more physical media 2590 constructed and arranged to receive a special-purpose sequence 2582 of two or more device-detectable instructions 2584 for implementing a flow as described herein or to receive an output of executing such instructions. Physical media 2590 may (optionally) be configured by writer 2501, transmitter 2432, or the like.

In some embodiments, such a "special-purpose" instruction sequence may include any ordered set of two or more instructions directly or indirectly operable for causing multipurpose hardware or software to perform one or more methods or functions described herein: source code, macro code, controller or other machine code, or the like. In some embodiments, an implementation may include one or more instances of special-purpose sequences 2582 of instructions 2584, patches or other implementation updates 2588, configurations 2594, special-purpose circuit designs 2593, or the like. Such "designs," for example, may include one or more instances of a mask set definition, a connectivity layout of one or more gates or other logic elements, an application-specific integrated circuit (ASIC), a multivariate transfer function, or the like.

Segments of such implementations or their outputs may (optionally) be manifested one or more information-bearing static attributes comprising the device-detectable implementation. Such attributes may, in some embodiments, comprise a concentration or other layout attribute of magnetic or charge-bearing elements, visible or other optical elements, or other particles in or on a liquid crystal display or other solid-containing medium. Solid state data storage modules or other such static media may further comprise one or more instances of laser markings, barcodes, human-readable identifiers, or the like, such as to indicate one or more attributes of the device-detectable implementation. Alternatively or additionally such solid state or other solid-containing media may include one or more instances of semiconductor devices or other circuitry, magnetic or optical digital storage disks, dynamic or flash random access memories (RAMs), or the like. Magnetoresistive RAMs may bear larger implementation or output portions or aggregations safely and efficiently, moreover, and without any need for motors or the like for positioning the storage medium.

Segments of such implementations or their outputs may likewise be manifested in electromagnetic signals 2586, laser or other optical signals 2591, electrical signals 2592, or the like. In some embodiments, for example, such electrical or electromagnetic signals may include one or more instances of static or variable voltage levels or other analog values, radio frequency transmissions or the like. In some embodiments, the above-mentioned "optical" signals may likewise include one or more instances of time- or position-dependent, device-detectable variations in hue, intensity, or the like. Alternatively or additionally, portions of such implementations or their outputs may manifest as one or more instances of magnetic, magneto-optic, electrostatic, or other physical configurations 2528 of nonvolatile storage media 2526 or as external implementation access services 2572.

In some embodiments, physical media may be configured by being "operated to bear" or "operated upon to bear" a signal. For example, they may include physical media that generate, transmit, conduct, receive, or otherwise convey or store a device-detectable implementation or output as described herein. Such conveyance or storing of a device-detectable implementation or output may be carried out in a distributed fashion at various times or locations, or such conveyance or storing of a device-detectable implementation or output may be done at one location or time. As discussed above, such physical media "operated to bear" or "operated upon to bear" may include physical media that are atypically constituted or adapted to facilitate methods or functions as described herein.

In some configurations, one or more output devices 2436 may present one or more results of presenting second content generation guidance partly based on the one or more potential recipient identifiers and partly based on the one or more user indications of the first content generation guidance in response to interface(s) 2430 receiving one or more invocations or outputs of an implementation of this function via linkage 2450. Such an "invocation" may, in some embodiments, comprise one or more instances of requests, hardware or software activations, user actions, or other determinants as described herein. Alternatively or additionally, in some embodiments, one or more input devices 2438 may later receive one or more invocations. In contexts like these, processor 2495 or other components of network 2490 may likewise constitute a secondary implementation having access to a primary instance of interface 2430 implementing methods like flow 200 as described herein.

Serial media 2560 comprises a communication channel of two or more media configured to bear a transition or other output increment successively. In some embodiments, for example, serial media 2560 may include a communication line or wireless medium (e.g., as medium 2565) between two signal-bearing conduits (e.g., terminals or antennas as media 2563, 2567). Alternatively or additionally, one or more lenses 2431 or other light-transmissive media may comprise a serial medium between a light-transmissive medium and a sensor or other light receiver 2433 or transmitter 2432. In some embodiments, such "light-transmissive" media may (optionally) comprise metamaterials or other media operable for bearing one or more instances of microwave signals, radiowave signals, visible light signals, or the like.

In some embodiments, such a lens may be an optical element that causes light to converge or diverge along one or more signal paths. Such a light-transmissive medium may include a signal-bearing conduit, glass, or other physical medium through which an optical signal may travel. More generally, a signal-bearing conduit may be an electrical wire, a telecommunications cable, a fiber-optic cable, or a mechanical coupling or other path for the conveyance of analog or digital signals.

Alternatively or additionally, system 2500 may likewise include one or more instances of media for handling implementations or their outputs: satellite dishes or other reflectors 2437, antennas 2435 or other transducers 2575, arrays of two or more such devices configured to detect or redirect one or more incoming signals, caching elements or other data-holding elements (e.g., disks 2544, memories 2546, or other media 2590), integrated circuits 2434, or the like. In some variants, one or more media may be "configured" to bear a device-detectable implementation as described herein by being constituted or otherwise specially adapted for that type of implementation at one or more respective times, overlapping or otherwise. Such "signal-bearing" media may include those configured to bear one or more such signals at various times as well as those currently bearing them.

In some embodiments, such caching elements may comprise a circuit or device configured to store data that duplicates original values stored elsewhere or computed earlier in time. For example, a caching element may be a temporary storage area where frequently-accessed data may be held for rapid access by a computing system. A caching element likewise may be machine-readable memory (including computer-readable media such as random access memory or data disks). In some embodiments, such caching elements may likewise comprise a latching circuit or device configured to store data that has been modified from original values associated with the data (held elsewhere or computed earlier in time, for example).

In one variant, respective portions 2595, 2596 of an expression 2599 of implementation 2507 may be sent through respective channels at various times. Invoker 2512 may request or otherwise attempt to activate a computer program or streaming media overseas via a telephone cable or other channel 2531. Meanwhile, output 2516 may attempt to trigger a session or other partial implementation 2552, success in which may be indicated by receiving expression 2555 into a visual display or other medium 2550. Such a program or other implementation may be made complete, for example, once both of these attempts succeed.

In some embodiments, transducer(s) 2575 may comprise one or more devices that convert a signal from one form to another form. For example, a transducer may be a cathode ray tube that transforms electrical signals into visual signals. Another example of a transducer comprises a microelectromechanical systems ("MEMS") device, which may be configured to convert mechanical signals into electrical signals (or vice versa).

With reference now to FIG. 26, there are shown several variants of the flow 200 of FIG. 2. Operation 250—obtaining one or more potential recipient identifiers and one or more user indications of first content generation guidance—may include one or more of the following operations: 2651 or 2655. In some embodiments, variants of operation 250 may be performed by one or more instances of interaction modules 130, 620, 730, 940 as exemplified herein. Operation 280—presenting second content generation guidance partly based on the one or more potential recipient identifiers and partly based on the one or more user indications of the first content generation guidance—may include one or more of the following operations: 2682, 2683, 2686, or 2687. In some embodiments, variants of operation 280 may be performed by one or more instances of support modules 335, 680, 760, 990 as exemplified herein.

Operation 2651 describes prompting at least one user for the one or more potential recipient identifiers at least partly based on the one or more user indications of the first content generation guidance (e.g. interaction module 620 invoking module 623 for providing one or more stimuli 610 including one or more instances of default destinations 611, queries 616, or other suitable signals 618 that one or more other destinations be added or substituted by a user). This may occur, for example, in a context in which system 100 (of FIG. 1) implements system 600 or system 800, in which (at least) interaction module 620 performs operation 250, in which user 101 has indicated one or more elements of guidance 171 that may initially be cryptic, and in which the destination(s) identified may affect which explanation 641, 642 for the element(s) is selected. In some variants, for example, designating one or more destinations 831, 841 (of FIG. 8) in place of destination 612 will invoke module 621 for performing an update by which filter 630 will be reconfigured using one or more corresponding retrieved parameters 838, 848. Alternatively or additionally, interaction module 620 may be configured to perform other aspects or instances of operation 250 as described herein, such as by later accepting a signal from module 622 for obtaining a user indication of other "first" content generation guidance.

Operation 2655 describes causing at least one user prompt to relate to the one or more user indications of the first content generation guidance at least partly based on the one or more potential recipient identifiers (e.g. interaction module 730 invoking module 728 for transmitting one or more queries 737 or other stimuli 738, 739 to user 301 that depend on one or more designated destinations 729, 841. This may occur, for example, in a context in which system 340 implements at least system 700 and in which at least one such stimulus 739 is configured to facilitate user 301 requesting or declining specifications 781, 782 or other parameters 848 regarding expression 775 or other guidance 771. Alternatively or additionally, a designated stimulus 739 may depend upon one or more of the users' preferred language 731, output device 336 or configuration 732 thereof, technical proficiency or other user-provided indication of level 733, ambient noise or light level 734, any logical combination 735 thereof, or other such determinants 736.

Operation 2682 describes configuring the second content generation guidance at least partly based on one or more local session attributes (e.g. support module 680 invoking module 591 for superseding some or all of guidance 530 with one or more portions 651, 652 of content 650 selected in response to one or more instances of session attribute variables 572). This may occur, for example, in a context in which system 600 includes or otherwise interacts with one or more instances of interface 500 (of FIG. 5), in which (at least) support module 680 performs operation 280, and in which module 672 extracts at least one such session attribute variable 572 from signal 627—specifying one or more determinants as described herein. Alternatively or additionally, module 591 may be configured to cause at least some guidance 530 to be supplemented without superseding it. In some variants, for example, module 591 may be configured to route at least one supplemental content portion 652 to speaker 519 while one or more images 522 of guidance 530 (to which portion 652 pertains) are visible. Conversely, in some variants, module 591 may be configured to select guidance in a visible format for supplementing a distinct sound used for guidance 530. In yet other variants, module 591 may be configured so that one or more session attribute variables 572 effectively require either visual or audible "second" content generation guidance according to how the "first" content generation guidance was conveyed, facilitating effective usage by drivers, exam takers, hearing-impaired users, or other users with significant operational restrictions.

Operation 2683 describes configuring the second content generation guidance at least partly by applying one or more quantitative criteria to a message content indicator (e.g. support module 990 invoking module 991 for assembling, modifying, or otherwise configuring one or more components 976, 977 of one or more versions 971-973 to explain one or more items of guidance for one or more specific users or other destinations 946). This may occur, for example, in a context in which system 100 implements or may otherwise access one or more instances of system 900 and in which support module 160 may likewise access support module 990 for performing operation 2683. Alternatively or additionally, one or more components 982 of such explanation may include audio content 983 as described herein. In some variants, moreover, user 101 may mention or point to one or more items of guidance 171 twice to trigger module 991 to perform operation 2683. In others, module 991 may be configured to count how many segments 987 between successive instances 984 of an occurrence (of instances 984 of a sound, for example), providing a response only to some destinations and only if the number of segments 987 is less than threshold 993.

Operation 2686 describes presenting the second content generation guidance and at least a portion of the first content generation guidance in a common image (e.g. support module 760 invoking image generation module 770 for constructing image 780 to include guidance 771 without completely obscuring a related expression 775 of guidance 772). This can occur in a context in which interface 750 projects or otherwise presents image 780 and in which interaction module 730 has already performed operation 250 by accepting an indication 742 of guidance 772, for example, in the form of user 301 allowing a cursor or similar item to hover over or near control 776. Alternatively or additionally, image generation module 770 may be configured so that guidance 771 appears in conjunction with related guidance 772 in response to user 301 stating or otherwise indicating interest in a warning tone or other auditory form 773 of guidance 772.

Operation 2687 describes configuring the second content generation guidance to include at least one linguistic expression (e.g. support module 760 invoking module 801 for causing guidance to include one or more spoken or written statements or other such expressions 775 to explain the significance of shape 415, its placement in relation to one or more content portions within image portion 412, or its operation as a control). This may occur, for example, in a context in which module 802 earlier placed the "first" content generation guidance in the form of shape 415 and/or its relation to one or more content portions 807, 808 as a preparatory portion of operation 250 described herein. Alternatively or additionally, other content generation guidance in a variety of forms may have been provided for, but not now indicated by, user 401. Examples are provided above, for example, in relation to guidance 171.

With reference now to FIG. 27, there are shown several variants of the flow 200 of FIG. 2 or FIG. 26. Operation 250—obtaining one or more potential recipient identifiers and one or more user indications of first content generation guidance—may include one or more of the following operations: 2753, 2755, or 2756. Operation 280—presenting second content generation guidance partly based on the one or more potential recipient identifiers and partly based on the one or more user indications of the first content generation guidance—may include one or more of the following operations: 2781, 2788, or 2789.

Operation 2753 describes configuring the one or more potential recipient identifiers to include one or more of a distribution list, a logical identifier, or more than one physical coordinate (e.g. interaction module 940 invoking module 942 for appending or otherwise assigning one or more instances of lists 911, network domain identifiers 912, usernames or other personal identifiers 913, or coordinates 921-922 to destination 946). This may occur, for example, in a context in which one or more support modules 160, 680, 760, 990 are nested, mutually accessible, or otherwise configured so that a specific telephone number or other identifier 913 may affect how operation 280 is performed. Alternatively or additionally, module 942 may be configured to obtain one or more instances of contributors' identifiers 914, content modifications 915, authorizations 923, certifications 924, version updates 933, or other determinants 930 that may control or otherwise influence one or more search or evaluation results 988 or other aspects of operation 280 as described herein. In some variants, for example, the content generation guidance may relate to a specific user's limitations relating, for example, to reading or modifying a document draft.

Operation 2755 describes receiving at least one of the one or more user indications of the first content generation guidance as a state transition indication relating to one or more graphical cues of the first content generation guidance (e.g. interaction module 620 invoking module 626 for detecting whether or when one or more patterns 628 occur in a received signal 627 that indicate a state change in switch 570 or other state variable 571 (of FIG. 5) corresponding to a visually detectable substitution of indicator 527 by indicator 568). This can occur in a context in which indicator 527 graphically signifies that control 526 is active and in which indicator 568 signifies that control 526 is inactive, for example, or vice versa. Alternatively or additionally, any of several respective symbols 561-563 may be used in an image 522 to show a current state 574 of a gradational or other multi-valued variable 573. In some variants, for example, such symbols may comprise one or more words, phrases, numbers, positions, or any combinations thereof.

Operation 2756 describes generating the first content generation guidance at least partly by applying one or more quantitative criteria to message content (e.g. interaction module 940 invoking module 941 for generating a rejection indication 951 if component 976 of version 973 is longer than threshold 952, if component 976 is larger than threshold 954, and/or if other components 977 are less numerous than threshold 953). This may occur, in a context in which video, audio, or other data components 981, 982 of version 971 are larger than 1 or 30 megabytes or gigabytes, for example. Alternatively or additionally, module 941 may be activated in response to a known destination 946, modified in response to another destination, or deactivated in response to a "null" destination, examples of which are described herein. In some implementations module 941 may implement one or more thresholds upon a subtracted, multiplied, added, or other such composite "indication" 932, for example. Many such arithmetic and/or logical determinant combinations are available to those of ordinary skill in light of these teachings, for example, so that values of identifiers 912-914 or other determinants effectively modify one or more levels 934 or other values of determinants 930 that module 941 will deem "conforming" to an effective threshold or other quantitative criteria.

Operation 2781 describes signaling whether any of the one or more potential recipient identifiers correspond with one or more criteria violated by tentative message content (e.g. support module 680 invoking module 672 for applying one or more parameters 838 or other criteria 676 to a preliminary auditory or other message version 661 after invoking module 801 for retrieving them from one or more records 830). This may occur, for example, in a context in which system 600 implements or otherwise accesses one or more instances of system 800 and in which the record(s) 830, 840 may be looked up using one or more instances of group identifiers, distribution lists, account numbers, domains, usernames, or other supplied destinations. Alternatively or additionally, one or more violations 682 may be detected by module 673 directly or indirectly causing destination-independent filter 677 to be applied to at least a portion 652 of content 650 in draft. In some variants, for example, module 671 may be used in preparation for module 672 applying destination-dependent filter 678 to some or all of content 660. In this context, for example, module 671 may be used for configuring one or more destination-dependent filters 678 to apply one or more thresholds 847 in response to a determination that the distribution will apparently include destination 841. In other embodiments, one or more filters 679 may be used to identify portions 652 to be transmitted to at least some destination for evaluation against one or more criteria for each such destination. The tentative message content may subsequently be blocked or modified in the event of a detected violation of such criteria.

Operation 2788 describes obtaining the second content generation guidance by using at least one of the one or more potential recipient identifiers (e.g. support module 335 invoking one or more modules 346, 803 for retrieving one or more presentation parameters 352 from or about system 310 or user 311 by using a name or other identifier 342 of such a destination). This may occur, for example, in a context in which module 346 uses the identifier(s) 342 for obtaining such information directly from system 310 or user 311, such as by transmitting one or more queries 345 for such information and waiting for a response. Alternatively or additionally, module 346 may be configured to extract the desired guidance 353 from system 700 directly in response to the identifier(s) 342, the indication(s) 343, and any tentative message content 344 or other determinants as described herein that may assist in the selection. In other embodiments, module 346 may be configured to extract such parameters 352 from system 700 for subsequent use in obtaining guidance 353 locally or from some other source. In some variants, for example, system 700 may be implemented in hub 380 or system 360, or in a distributed implementation across more than one portion of system 300.

Operation 2789 describes obtaining one or more content evaluation parameters at least partly based on the one or more potential recipient identifiers (e.g. configuration module 763 invoking module 764 for selecting one or more instances of search terms 836, commands, conditions, thresholds 837, or the like for implementation as one or more components 768 of filter 767). This may occur, for example, in a context in which support module 760 implements or otherwise accesses one or more media 810 of system 800 and in which user 301 identifies at least a specific destination 831 associated with one or more such parameters 838, optionally by inclusion in a common record 830 or similar encoding. Alternatively or additionally, user 301 may likewise identify one or more other records 840 by specifying one or more other criteria 842 associated therewith. Alternatively or additionally, configuration module 763 may be configured to receive one or more such components 769 from one or more default recipient identifiers or other destinations 729, optionally in response to component request module 762 having requested such component(s) 769 from or about the destination(s) 729. In some variants, for example, system 340 may implement system 700 and may by configured to receive information about system 350 either from system 350 or from hub 380.

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those skilled in the art will recognize that it is common within the art to describe devices and/or processes in the fashion set forth herein, and thereafter use engineering practices to integrate such described devices and/or processes into image processing systems. That is, at least a portion of the devices and/or processes described herein can be integrated into an image processing system via a reasonable amount of experimentation. Those having skill in the art will recognize that a typical image processing system generally includes one or more of a system unit housing, a video display device, a memory such as volatile and non-volatile memory, processors such as microprocessors and digital signal processors, computational entities such as operating systems, drivers, and applications programs, one or more interaction devices, such as a touch pad or screen, control systems including feedback loops and control motors (e.g., feedback for sensing lens position and/or velocity; control motors for moving/distorting lenses to give desired focuses. A typical image processing system may be implemented utilizing any suitable commercially available components, such as those typically found in digital still systems and/or digital motion systems.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

Those skilled in the art will recognize that it is common within the art to implement devices and/or processes and/or systems in the fashion(s) set forth herein, and thereafter use engineering and/or business practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, hovercraft, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Quest, Southwestern Bell, etc), or (g) a wired/wireless services entity such as Sprint, Cingular, Nextel, etc.), etc.

One skilled in the art will recognize that the herein described components (e.g., steps), devices, and objects and the discussion accompanying them are used as examples for the sake of conceptual clarity and that various configuration modifications are within the skill of those in the art. Consequently, as used herein, the specific exemplars set forth and the accompanying discussion are intended to be representative of their more general classes. In general, use of any specific exemplar herein is also intended to be representative of its class, and the non-inclusion of such specific components (e.g., steps), devices, and objects herein should not be taken as indicating that limitation is desired.

Although users 101, 301, 311, 401, 1101, 1701 are shown/described herein each as a single illustrated figure, those skilled in the art will appreciate that such users may be representative of a human user, a robotic user (e.g., computational entity), and/or substantially any combination thereof (e.g., a user may be assisted by one or more robotic agents). In addition, each such user, as set forth herein, although shown as a single entity may in fact be composed of two or more entities. Those skilled in the art will appreciate that, in general, the same may be said of "sender" and/or other entity-oriented terms as such terms are used herein.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

With respect to the appended claims, those skilled in the art will appreciate that recited operations therein may generally be performed in any order. Examples of such alternate orderings may include overlapping, interleaved, interrupted, reordered, incremental, preparatory, supplemental, simultaneous, reverse, or other variant orderings, unless context dictates otherwise. With respect to context, even terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system comprising:
   means for obtaining one or more potential recipient identifiers and one or more user indications of first content generation guidance, in which the means for obtaining one or more potential recipient identifiers and one or more user indications of first content generation guidance comprises at least one of
- (a) means for prompting at least one user for the one or more potential recipient identifiers at least partly based on the one or more user indications of the first content generation guidance,
- (b) means for causing at least one user prompt to relate to the one or more user indications of the first content generation guidance at least partly based on the one or more potential recipient identifiers,
- (c) means for receiving at least one of the one or more user indications of the first content generation guidance as a state transition indication relating to one or more graphical cues of the first content generation guidance, or
- (d) means for generating the first content generation guidance at least partly by applying one or more quantitative criteria to message content; and means for presenting second content generation guidance partly based on the one or more potential recipient identifiers and partly based on the one or more user indications of the first content generation guidance.

2. The system of claim 1 in which the means for obtaining one or more potential recipient identifiers and one or more user indications of first content generation guidance comprises:
means for receiving at least one of the one or more user indications of the first content generation guidance as a state transition indication relating to one or more graphical cues of the first content generation guidance.

3. The system of claim 1 in which the means for obtaining one or more potential recipient identifiers and one or more user indications of first content generation guidance comprises:
- (a) means for prompting at least one user for the one or more potential recipient identifiers at least partly based on the one or more user indications of the first content generation guidance.

4. The system of claim 1 in which the means for obtaining one or more potential recipient identifiers and one or more user indications of first content generation guidance comprises:
- (b) means for causing at least one user prompt to relate to the one or more user indications of the first content generation guidance at least partly based on the one or more potential recipient identifiers.

5. The system of claim 1 in which the means for obtaining one or more potential recipient identifiers and one or more user indications of first content generation guidance comprises:
- (d) means for generating the first content generation guidance at least partly by applying one or more quantitative criteria to message content.

6. The system of claim 1 in which the means for presenting second content generation guidance partly based on the one or more potential recipient identifiers and partly based on the one or more user indications of the first content generation guidance comprises:
- (1) means for presenting the second content generation guidance and at least a portion of the first content generation guidance in a common image.

7. The system of claim 1 in which the means for presenting second content generation guidance partly based on the one or more potential recipient identifiers and partly based on the one or more user indications of the first content generation guidance comprises:
- (2) means for configuring the second content generation guidance to include at least one linguistic expression.

8. The system of claim 1 in which the means for presenting second content generation guidance partly based on the one or more potential recipient identifiers and partly based on the one or more user indications of the first content generation guidance comprises:
- (3) means for signaling whether any of the one or more potential recipient identifiers correspond with one or more criteria violated by tentative message content.

9. The system of claim 1 in which the means for presenting second content generation guidance partly based on the one or more potential recipient identifiers and partly based on the one or more user indications of the first content generation guidance comprises:
- (4) means for obtaining one or more content evaluation parameters at least partly based on the one or more potential recipient identifiers.

10. A system comprising:
circuitry for obtaining one or more potential recipient identifiers and one or more user indications of first content generation guidance; and
circuitry for presenting second content generation guidance partly based on the one or more potential recipient identifiers and partly based on the one or more user indications of the first content generation guidance, in which the circuitry for presenting second content generation guidance partly based on the one or more potential recipient identifiers and partly based on the one or more user indications of the first content generation guidance comprises at least one of
- (1) circuitry for presenting the second content generation guidance and at least a portion of the first content generation guidance in a common image,
- (2) circuitry for configuring the second content generation guidance to include at least one linguistic expression,
- (3) circuitry for signaling whether any of the one or more potential recipient identifiers correspond with one or more criteria violated by tentative message content, or
- (4) circuitry for obtaining one or more content evaluation parameters at least partly based on the one or more potential recipient identifiers.

11. The system of claim 10 in which the circuitry for obtaining one or more potential recipient identifiers and one or more user indications of first content generation guidance comprises:
circuitry for prompting at least one user for the one or more potential recipient identifiers at least partly based on the one or more user indications of the first content generation guidance.

12. The system of claim 10 in which the circuitry for obtaining one or more potential recipient identifiers and one or more user indications of first content generation guidance comprises:
circuitry for causing at least one user prompt to relate to the one or more user indications of the first content generation guidance at least partly based on the one or more potential recipient identifiers.

13. The system of claim 10 in which the circuitry for presenting second content generation guidance partly based on the one or more potential recipient identifiers and partly based on the one or more user indications of the first content generation guidance comprises:
circuitry for configuring the second content generation guidance at least partly based on one or more local session attributes.

14. The system of claim 10 in which the circuitry for presenting second content generation guidance partly based on the one or more potential recipient identifiers and partly based on the one or more user indications of the first content generation guidance comprises:
  circuitry for configuring the second content generation guidance at least partly by applying one or more quantitative criteria to a message content indicator.

15. The system of claim 10 in which the circuitry for presenting second content generation guidance partly based on the one or more potential recipient identifiers and partly based on the one or more user indications of the first content generation guidance comprises:
  circuitry for presenting the second content generation guidance and at least a portion of the first content generation guidance in a common image.

16. The system of claim 10 in which the circuitry for presenting second content generation guidance partly based on the one or more potential recipient identifiers and partly based on the one or more user indications of the first content generation guidance comprises:
  circuitry for configuring the second content generation guidance to include at least one linguistic expression.

17. The system of claim 10 in which the circuitry for obtaining one or more potential recipient identifiers and one or more user indications of first content generation guidance comprises:
  circuitry for configuring the one or more potential recipient identifiers to include one or more of a distribution list, a logical identifier, or more than one physical coordinate.

18. The system of claim 10 in which the circuitry for obtaining one or more potential recipient identifiers and one or more user indications of first content generation guidance comprises:
  circuitry for receiving at least one of the one or more user indications of the first content generation guidance as a state transition indication relating to one or more graphical cues of the first content generation guidance.

19. The system of claim 10 in which the circuitry for obtaining one or more potential recipient identifiers and one or more user indications of first content generation guidance comprises:
  circuitry for generating the first content generation guidance at least partly by applying one or more quantitative criteria to message content.

20. The system of claim 10 in which the circuitry for presenting second content generation guidance partly based on the one or more potential recipient identifiers and partly based on the one or more user indications of the first content generation guidance comprises:
  circuitry for signaling whether any of the one or more potential recipient identifiers correspond with one or more criteria violated by tentative message content.

21. The system of claim 10 in which the circuitry for obtaining one or more potential recipient identifiers and one or more user indications of first content generation guidance comprises:
  circuitry for causing at least one user prompt to relate to the one or more user indications of the first content generation guidance at least partly based on the one or more potential recipient identifiers;
  circuitry for configuring the one or more potential recipient identifiers to include one or more of a distribution list, a logical identifier, or more than one physical coordinate;
  circuitry for receiving at least one of the one or more user indications of the first content generation guidance as a state transition indication relating to one or more graphical cues of the first content generation guidance; and
  circuitry for generating the first content generation guidance at least partly by applying one or more quantitative criteria to message content.

22. The system of claim 10 in which the circuitry for presenting second content generation guidance partly based on the one or more potential recipient identifiers and partly based on the one or more user indications of the first content generation guidance comprises:
  circuitry for obtaining one or more content evaluation parameters at least partly based on the one or more potential recipient identifiers;
  circuitry for obtaining the second content generation guidance by using at least one of the one or more potential recipient identifiers;
  circuitry for configuring the second content generation guidance partly based on one or more local session attributes and partly by applying one or more quantitative criteria to a message content indicator;
  circuitry for presenting the second content generation guidance and at least a portion of the first content generation guidance in a common image; and
  circuitry for signaling whether any of the one or more potential recipient identifiers correspond with one or more criteria violated by tentative message content.

23. The system of claim 11 in which the circuitry for presenting second content generation guidance partly based on the one or more potential recipient identifier and partly based on the one or more user indications of the first content generation guidance comprises:
  (3) circuitry for signaling whether any of the one or more potential recipient identifiers correspond with one or more criteria violated by tentative message content.

24. The system of claim 15 in which the circuitry for obtaining one or more potential recipient identifiers and one or more user indications of first content generation guidance comprises:
  (a) circuitry for prompting at least one user for the one or more potential recipient identifiers at least partly based on the one or more user indications of the first content generation guidance.

25. The system of claim 16 in which the circuitry for obtaining one or more potential recipient identifiers and one or more user indications of first content generation guidance comprises:
  (b) circuitry for causing at least one user prompt to relate to the one or more user indications of the first content generation guidance at least partly based on the one or more potential recipient identifiers.

26. The system of claim 18 in which the circuitry for presenting second content generation guidance partly based on the one or more potential recipient identifiers and partly based on the one or more user indications of the first content generation guidance comprises:
  (2) circuitry for configuring the second content generation guidance to include at least one linguistic expression.

27. The system of claim 19 in which the circuitry for presenting second content generation guidance partly based on the one or more potential recipient identifiers and partly based on the one or more user indications of the first content generation guidance comprises:
  (4) circuitry for obtaining one or more content evaluation parameters at least partly based on the one or more potential recipient identifiers.

28. The system of claim 20 in which the circuitry for obtaining one or more potential recipient identifiers and one or more user indications of first content generation guidance comprises:
- (c) circuitry for receiving at least one of the one or more user indications of the first content generation guidance as a state transition indication relating to one or more graphical cues of the first content generation guidance.

29. The system of claim 20 in which the circuitry for obtaining one or more potential recipient identifiers and one or more user indications of first content generation guidance comprises:
- (d) circuitry for generating the first content generation guidance at least partly by applying one or more quantitative criteria to message content.

30. A system comprising:
circuitry for obtaining one or more potential recipient identifiers and one or more user indications of first content generation guidance in which the circuitry for obtaining one or more potential recipient identifiers and one or more user indications of first content generation guidance comprises at least one of
- (a) circuitry for prompting at least one user for the one or more potential recipient identifiers at least partly based on the one or more user indications of the first content generation guidance,
- (b) circuitry for causing at least one user prompt to relate to the one or more user indications of the first content generation guidance at least partly based on the one or more potential recipient identifiers,
- (c) circuitry for receiving at least one of the one or more user indications of the first content generation guidance as a state transition indication relating to one or more graphical cues of the first content generation guidance, or
- (d) circuitry for generating the first content generation guidance at least partly by applying one or more quantitative criteria to message content; and circuitry for presenting second content generation guidance partly based on the one or more potential recipient identifiers and partly based on the one or more user indications of the first content generation guidance.

31. The system of claim 30 in which the circuitry for obtaining one or more potential recipient identifiers and one or more user indications of first content generation guidance comprises:
- (a) circuitry for prompting at least one user for the one or more potential recipient identifiers at least partly based on the one or more user indications of the first content generation guidance.

32. The system of claim 30 in which the circuitry for obtaining one or more potential recipient identifiers and one or more user indications of first content generation guidance comprises:
- (b) circuitry for causing at least one user prompt to relate to the one or more user indications of the first content generation guidance at least partly based on the one or more potential recipient identifiers.

33. The system of claim 30 in which the circuitry for presenting second content generation guidance partly based on the one or more potential recipient identifiers and partly based on the one or more user indications of the first content generation guidance comprises:
- (6) circuitry for configuring the second content generation guidance at least partly based on one or more local session attributes.

34. The system of claim 30 in which the circuitry for presenting second content generation guidance partly based on the one or more potential recipient identifiers and partly based on the one or more user indications of the first content generation guidance comprises:
- (5) circuitry for configuring the second content generation guidance at least partly by applying one or more quantitative criteria to a message content indicator.

35. The system of claim 30 in which the circuitry for presenting second content generation guidance partly based on the one or more potential recipient identifiers and partly based on the one or more user indications of the first content generation guidance comprises:
- (1) circuitry for presenting the second content generation guidance and at least a portion of the first content generation guidance in a common image.

36. The system of claim 30 in which the circuitry for presenting second content generation guidance partly based on the one or more potential recipient identifiers and partly based on the one or more user indications of the first content generation guidance comprises:
- (2) circuitry for configuring the second content generation guidance to include at least one linguistic expression.

37. The system of claim 30 in which the circuitry for obtaining one or more potential recipient identifiers and one or more user indications of first content generation guidance comprises:
- (e) circuitry for configuring the one or more potential recipient identifiers to include one or more of a distribution list, a logical identifier, or more than one physical coordinate.

38. The system of claim 30 in which the circuitry for obtaining one or more potential recipient identifiers and one or more user indications of first content generation guidance comprises:
- (c) circuitry for receiving at least one of the one or more user indications of the first content generation guidance as a state transition indication relating to one or more graphical cues of the first content generation guidance.

39. The system of claim 30 in which the circuitry for obtaining one or more potential recipient identifiers and one or more user indications of first content generation guidance comprises:
- (d) circuitry for generating the first content generation guidance at least partly by applying one or more quantitative criteria to message content.

40. The system of claim 30 in which the circuitry for presenting second content generation guidance partly based on the one or more potential recipient identifiers and partly based on the one or more user indications of the first content generation guidance comprises:
- (3) circuitry for signaling whether any of the one or more potential recipient identifiers correspond with one or more criteria violated by tentative message content.

41. The system of claim 30 in which the circuitry for presenting second content generation guidance partly based on the one or more potential recipient identifiers and partly based on the one or more user indications of the first content generation guidance comprises:
- (4) circuitry for obtaining one or more content evaluation parameters at least partly based on the one or more potential recipient identifiers.

42. A system comprising:
circuitry for obtaining one or more potential recipient identifiers and one or more user indications of first content generation guidance; and circuitry for presenting second content generation guidance partly based on the one or more potential recipient identifiers and partly based on the one or more user indications of the first content generation guidance, in which the circuitry for presenting second content generation guidance partly based on the one or more potential recipient identifiers and partly based on the one or more user indications of the first content generation guidance comprises:

circuitry for obtaining one or more content evaluation parameters at least partly based on the one or more potential recipient identifiers.

43. The system of claim 42 in which the circuitry for presenting second content generation guidance partly based on the one or more potential recipient identifiers and partly based on the one or more user indications of the first content generation guidance comprises:

(2) circuitry for configuring the second content generation guidance to include at least one linguistic expression.

44. The system of claim 42 in which the circuitry for presenting second content generation guidance partly based on the one or more potential recipient identifiers and partly based on the one or more user indications of the first content generation guidance comprises:

(3) circuitry for signaling whether any of the one or more potential recipient identifiers correspond with one or more criteria violated by tentative message content.

45. The system of claim 42 in which the circuitry for obtaining one or more potential recipient identifiers and one or more user indications of first content generation guidance comprises:

(a) circuitry for prompting at least one user for the one or more potential recipient identifiers at least partly based on the one or more user indications of the first content generation guidance.

46. The system of claim 42 in which the circuitry for obtaining one or more potential recipient identifiers and one or more user indications of first content generation guidance comprises:

(b) circuitry for causing at least one user prompt to relate to the one or more user indications of the first content generation guidance at least partly based on the one or more potential recipient identifiers.

47. The system of claim 42 in which the circuitry for obtaining one or more potential recipient identifiers and one or more user indications of first content generation guidance comprises:

(c) circuitry for receiving at least one of the one or more user indications of the first content generation guidance as a state transition indication relating to one or more graphical cues of the first content generation guidance.

48. The system of claim 42 in which the circuitry for obtaining one or more potential recipient identifiers and one or more user indications of first content generation guidance comprises:

(d) circuitry for generating the first content generation guidance at least partly by applying one or more quantitative criteria to message content.

49. An apparatus comprising:
one or more physical media bearing a device-detectable output indicating an occurrence of
obtaining one or more potential recipient identifiers and one or more user indications of first content generation guidance; and
presenting second content generation guidance partly based on the one or more potential recipient identifiers and partly based on the one or more user indications of the first content generation guidance in which the presenting second content generation guidance partly based on the one or more potential recipient identifiers and partly based on the one or more user indications of the first content generation guidance comprises at least one of (1) presenting the second content generation guidance and at least a portion of the first content generation guidance in a common image,
(2) configuring the second content generation guidance to include at least one linguistic expression,
(3) signaling whether any of the one or more potential recipient identifiers correspond with one or more criteria violated by tentative message content, or
(4) obtaining one or more content evaluation parameters at least partly based on the one or more potential recipient identifiers.

50. The apparatus of claim 49 comprising:
the one or more physical media bearing the device-detectable output indicating an occurrence of the presenting the second content generation guidance partly based on the one or more potential recipient identifiers and partly based on the one or more user indications of the first content generation guidance in which the presenting the second content generation guidance partly based on the one or more potential recipient identifiers and partly based on the one or more user indications of the first content generation guidance comprises (2) configuring the second content generation guidance to include at least one linguistic expression.

51. The apparatus of claim 49 comprising:
the one or more physical media bearing the device-detectable output indicating an occurrence of the presenting the second content generation guidance partly based on the one or more potential recipient identifiers and partly based on the one or more user indications of the first content generation guidance in which the presenting the second content generation guidance partly based on the one or more potential recipient identifiers and partly based on the one or more user indications of the first content generation guidance comprises (3) signaling whether any of the one or more potential recipient identifiers correspond with one or more criteria violated by tentative message content.

52. The apparatus of claim 49 comprising:
the one or more physical media bearing the device-detectable output indicating an occurrence of the presenting the second content generation guidance partly based on the one or more potential recipient identifiers and partly based on the one or more user indications of the first content generation guidance in which the presenting the second content generation guidance partly based on the one or more potential recipient identifiers and partly based on the one or more user indications of the first content generation guidance comprises (4) obtaining one or more content evaluation parameters at least partly based on the one or more potential recipient identifiers.

53. The apparatus of claim 49 comprising:
the one or more physical media bearing the device-detectable output indicating an occurrence of the obtaining the one or more potential recipient identifiers and the one or more user indications of the first content generation guidance in which the obtaining the one or more potential recipient identifiers and the one or more user indications of the first content generation guidance comprises at least one of (a) prompting at least one user for the one or more potential recipient identifiers at least partly based on the one or more user indications of the first content generation guidance.

54. The apparatus of claim 49 comprising:
the one or more physical media bearing the device-detectable output indicating an occurrence of the obtaining the one or more potential recipient identifiers and the one or more user indications of the first content generation guidance in which the obtaining the one or more potential recipient identifiers and the one or more user indications of the first content generation guidance comprises at least one of (c) receiving at least one of the one or more user indications of the first content generation guidance as a state transition indication relating to one or more graphical cues of the first content generation guidance.

55. The apparatus of claim 49 comprising:
the one or more physical media bearing the device-detectable output indicating an occurrence of the obtaining the one or more potential recipient identifiers and the one or more user indications of the first content generation guidance in which the obtaining the one or more potential recipient identifiers and the one or more user indications of the first content generation guidance comprises at least one of (d) generating the first content generation guidance at least partly by applying one or more quantitative criteria to message content.

56. The system of claim 10 in which the circuitry for presenting second content generation guidance partly based on the one or more potential recipient identifiers and partly based on the one or more user indications of the first content generation guidance comprises:
circuitry for obtaining the second content generation guidance by using at least one of the one or more potential recipient identifiers.

* * * * *